US012183011B2

(12) United States Patent
Liu et al.

(10) Patent No.: US 12,183,011 B2
(45) Date of Patent: Dec. 31, 2024

(54) CONFIDENCE-BASED SEGMENTATION OF MULTIPLE UNITS

(71) Applicant: Embodied Intelligence Inc., Berkeley, CA (US)

(72) Inventors: YuXuan Liu, Berkeley, CA (US); Xi Chen, Berkeley, CA (US); Nikhil Mishra, Berkeley, CA (US)

(73) Assignee: Embodied Intelligence Inc., Emeryville, CA (US)

( * ) Notice: Subject to any disclaimer, the term of this patent is extended or adjusted under 35 U.S.C. 154(b) by 113 days.

(21) Appl. No.: 17/161,344

(22) Filed: Jan. 28, 2021

(65) Prior Publication Data

US 2021/0233246 A1 Jul. 29, 2021

Related U.S. Application Data

(60) Provisional application No. 62/966,802, filed on Jan. 28, 2020.

(51) Int. Cl.
*G06T 7/00* (2017.01)
*B65G 47/90* (2006.01)
(Continued)

(52) U.S. Cl.
CPC .............. *G06T 7/11* (2017.01); *B65G 47/905* (2013.01); *G06F 18/217* (2023.01); *G06V 10/255* (2022.01); *G06V 10/82* (2022.01)

(58) Field of Classification Search
CPC . G06T 7/11; G06T 2207/20081; G06V 10/82; G06V 10/764; G06V 10/26;
(Continued)

(56) References Cited

U.S. PATENT DOCUMENTS 10,127,438 B1  11/2018  Fisher
10,713,794 B1 *  7/2020  He .................... G06V 10/764
(Continued)

OTHER PUBLICATIONS

H. Kim, J. J. Thiagarajan and P.-T. Bremer, "Image segmentation using consensus from hierarchical segmentation ensembles," 2014 IEEE International Conference on Image Processing (ICIP), Paris, France, 2014, pp. 3272-3276, doi: 10.1109/ICIP.2014.7025662. (Year: 2014).*
(Continued)

*Primary Examiner* — Li Liu

(57) ABSTRACT

Various embodiments of the present technology generally relate to robotic devices and artificial intelligence. More specifically, some embodiments relate to modeling uncertainty in neural network segmentation predictions of imaged scenes having a plurality of objects. In some embodiments, a computer vision system for guiding robotic picking utilizes a method for uncertainty modeling that comprises receiving one or more images of a scene comprising a plurality of distinct objects, generating a plurality of segmentation predictions each comprising one or more object masks, identifying a predefined confidence requirement, wherein the confidence requirement identifies a minimum amount of required agreement for a region, and outputting one or more object masks based on the confidence requirement. The systems and methods disclosed herein leverage the use of a plurality of hypotheses to create a distribution of possible segmentation outcomes in order model uncertainty associated with image segmentation.

17 Claims, 17 Drawing Sheets
(11 of 17 Drawing Sheet(s) Filed in Color)

(51) Int. Cl.
*G06F 18/21* (2023.01)
*G06T 7/11* (2017.01)
*G06V 10/20* (2022.01)
*G06V 10/82* (2022.01)

(58) Field of Classification Search
CPC .. G06V 30/19173; G06V 20/695; G06N 3/08; G06K 9/6262
See application file for complete search history.

(56) References Cited

U.S. PATENT DOCUMENTS

| | | | | |
|---|---|---|---|---|
| 2005/0232466 | A1* | 10/2005 | Kampchen | G06V 20/58 382/104 |
| 2009/0129675 | A1* | 5/2009 | Eggert | G06T 7/215 382/173 |
| 2018/0365835 | A1* | 12/2018 | Yan | G06V 10/26 |
| 2019/0057507 | A1* | 2/2019 | El-Khamy | G06T 5/20 |
| 2019/0073775 | A1* | 3/2019 | Lam | G06V 20/00 |
| 2020/0034984 | A1* | 1/2020 | Puchkarev | G06V 10/7784 |
| 2021/0004965 | A1* | 1/2021 | Tung | G06F 18/232 |
| 2021/0046861 | A1* | 2/2021 | Li | G06T 7/11 |

OTHER PUBLICATIONS

Ammour Nassim, et al, A Dynamic Weights OWA Fusion For Ensemble Clustering; Signal, Image and Video Processing, Springer London, London, vol. 9, No. 3, Jun. 16, 2013, pp. 727-734, 8 pages.

Cho et al., Image Segmentation From Consensus Information; Computer Vision and Image Understanding, Academic Press, US, vol. 68, No. 1, Oct. 1, 1997, pp. 72-89, 18 pages.

International Search Report and Written Opinion for PCT/US2021/015541, filed Jan. 28, 2021, mailed Apr. 30, 2021; 17 pages.

Milan, et al, Semantic Segmentation from Limited Training Data; 2018 IEEE International Conference on Robotics and automation (ICRA), IEEE, May 21, 2018, pp. 1908-1915, 8 pages.

Kohl et al., "A Hierarchical Probabilistic U-Net for Modeling Multi-Scale Ambiguities", May 30, 2019, arXiv:1905.13077v1.

Feng et al., "Towards Safe Autonomous Driving: Capture Uncertainty in the Deep Neural Network for Lidar 3D Vehicle Detection", Sep. 7, 2018, arXiv:1804.05132v2.

Mazloumi et al., "Prediction intervals to account for uncertainties in neural network predictions: Methodology and application in bus travel time prediction", Apr. 2011, Eng. Appl. of Artificial Intelligence, 24(3):534-542.

Thakur et al., "Uncertainty Aware Learning from Demonstrations in Multiple Contexts using Bayesian Neural Networks", Mar. 13, 2019, zrXiv:1903.05697v1.

Redmon et al., "You Only Look Once: Unified, Real-Time Object Detection", May 9, 2016, arXiv:1506.02640v5, pp. 779-788.

Liu, "One Point, One Object: Simultaneous 3D Object Segmentation and 6-DOF Pose Estimation", Dec. 27, 2019, arXiv:1912.12095v1.

Liang et al., "Proposal-free Network for Instance-level Object Segmentation", Sep. 10, 2015, arXiv:1509.02636v2.

Kabir et al., "Neural Network-Based Uncertainty Quantification: A Survey of Methodologies and Applications", Jun. 4, 2018, IEEE Access, vol. 6, pp. 36218-36234.

\* cited by examiner

700

CONFIDENCE-BASED SEGMENTATION OF MULTIPLE UNITS

CROSS-REFERENCE TO RELATED APPLICATIONS

This application is related to and claims priority to U.S. Provisional Patent Application No. 62/966,802, entitled "CONFIDENCE-BASED SEGMENTATION OF MULTIPLE UNITS," filed on Jan. 28, 2020, which is incorporated by reference herein in its entirety.

BACKGROUND

Many tasks require the ability of a machine to sense or perceive its environment and apply knowledge about its environment to future decisions. Machines programmed solely to repeat a task or action, encounter issues or frequently get stuck, often requiring human intervention too frequently to increase productivity or efficiency. Robotic devices and other machines are often guided with some degree of computer vision.

Computer vision techniques enable a system to gain insight into its environment based on digital images, videos, scans, and similar visual mechanisms. High-level vision systems are necessary for a machine to accurately acquire, process, and analyze data from the real world. Computer vision and machine learning techniques allow a machine to receive input and generate output based on the input. Some machine learning techniques utilize deep artificial neural networks having one or more hidden layers for performing a series of calculations leading to the output. In many present-day applications, convolutional neural networks are used for processing images as input and generating a form of output or making decisions based on the output.

Artificial neural networks, modeled loosely after the human brain, learn mapping functions from inputs to outputs and are designed to recognize patterns. A deep neural network comprises an input layer and an output layer, with one or more hidden layers in between. The layers are made up of nodes, in which computations take place. Various training methods are used to train an artificial neural network during which the neural network uses optimization to continually update weights at the various nodes based on failures until a satisfactory model is achieved. Many types of deep neural networks currently exist and are used for a broad variety of applications and industries including computer vision, series forecasting, automated driving, performing medical procedures, aerospace, and many more. One advantage of deep artificial neural networks is their ability to learn by example, rather than needing to be specifically programmed to perform a task, especially when the tasks would require an impossible amount of programming to perform the operations they are used for today.

It is with respect to this general technical environment that aspects of the present technology disclosed herein have been contemplated. Furthermore, although a general environment has been discussed, it should be understood that the examples described herein should not be limited to the general environment identified in the background.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments of the present technology generally relate to robotic devices and artificial intelligence. More specifically, some embodiments relate to systems, devices, and methods for segmenting images and modeling their uncertainty. In an embodiment of the present technology, a method of operating an image segmentation system comprises collecting at least one image of a scene, wherein the scene comprises a plurality of distinct objects. In some examples the distinct objects may be multiple of the same object, or a variety of different objects. The method further comprises generating a plurality of segmentation prediction for the scene, wherein each segmentation prediction of the plurality of segmentation predictions includes one or more object regions each representing a region predicted to correspond to a single object. The method further comprises outputting a final segmentation prediction comprising at least on identified object region, wherein the at least one identified object region is chosen based on a confidence associated with the at least one identified object region and a confidence threshold. In some embodiments outputting a final segmentation prediction comprises identifying the confidence threshold, wherein the confidence requirement corresponds to a minimum percentage, and identifying regions in which the minimum percentage of segmentation predictions from the plurality of segmentation predictions include at least a portion of an object region.

The confidence associated with the at least one identified object region may be greater than the confidence threshold. In some embodiments, the method further comprises, for an additional identified object region, determining that a confidence associated with the additional identified object region does not exceed the confidence threshold. The image segmentation system may further comprise a computer-imaging system comprising one or more camera and a robotic device comprising at least one picking element. In certain embodiments, based on the final segmentation prediction, the segmentation system directs the robotic device to attempt to pick up an object of the plurality of distinct objects using the at least one picking element and determines that the robotic device successfully picked up the object using the picking element.

In an alternative embodiment of the present technology, a system comprises one or more computer-readable storage media, a processing system operatively coupled to the one or more computer-readable storage media, and program instructions, stored on the one or more computer-readable storage media. The program instructions, when read and executed by the processing system, direct the processing system to collect at least one image of a scene, wherein the scene comprises a plurality of distinct objects, generate a plurality of segmentation predictions for the scene, wherein each segmentation prediction of the plurality of segmentation predictions includes one or more object regions each representing a region predicted to correspond to a single object, and output a final segmentation prediction comprising at least one identified object region, wherein the at least one identified object region is chosen based on a confidence associated with the at least one identified object region and a confidence threshold.

In yet another embodiment, one or more computer-readable storage media have program instructions stored thereon to generate segmentation predictions. The program instructions, when read and executed by a processing system, direct the processing system to at least collect at least one image of a scene, wherein the scene comprises a plurality of distinct objects, generate a plurality of segmentation predictions for the scene, wherein each segmentation prediction of the plurality of segmentation predictions includes one or more object regions each representing a region predicted to correspond to a single object, and output a final segmentation prediction comprising at least one identified object region, wherein the at least one identified object region is chosen based on a confidence associated with the at least one identified object region and a confidence threshold.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
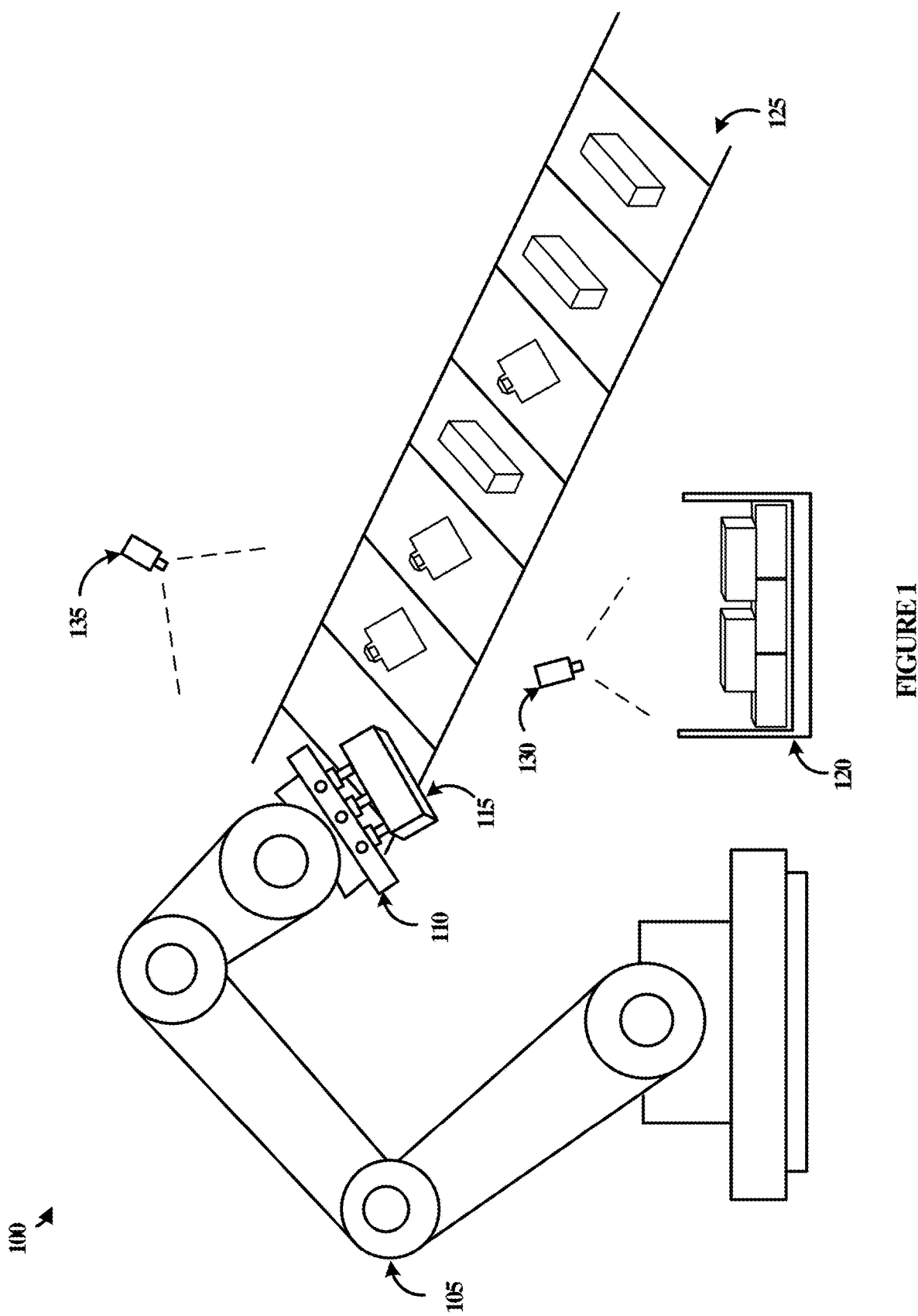
FIG. 1 illustrates a computer vision and robotic picking environment in accordance with some embodiments of the present technology.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the technology described herein generally relate to systems and methods for modeling uncertainty. More specifically, certain embodiments relate to neural network models for expressing uncertainty in various relevant dimensions and methods for utilizing knowledge related to uncertainty in a meaningful way. In some embodiments, a robotic device may work in collaboration with a computer vision system for collecting visual data. Based on the visual data, machine learning techniques are implemented for identifying and quantifying uncertainty related to one or more dimensions of the visual data. The system can then make decisions related to future actions performed by the robotic device based on the uncertainty and operate the robotic device accordingly. In some examples, the machine learning techniques comprise the utilization of one or more artificial neural networks.

Artificial neural networks, such as those that may be implemented within embodiments related to computer vision, uncertainty modeling, picking, segmentation, ranking, and depth perception models described herein, are used to learn mapping functions from inputs to outputs. Generating mapping functions is done through neural network training processes. Many various types of training and machine learning methods presently exist and are commonly used including supervised learning, unsupervised learning, reinforcement learning, imitation learning, and many more. During training, the weights in a neural network are continually updated in response to errors, failures, or mistakes. In order to create a robust, working model, training data is used to initially dial in the weights until a sufficiently strong model is found or the learning process gets stuck and is forced to stop. In some implementations, the weights may continue to update throughout use, even after the training period is over, while in other implementations, they may not be allowed to update after the training period.

Parameters of a neural network are found using optimization with many, or sometimes infinite, possible solutions. Modern deep learning models, especially for computer vision and image processing, are based on convolutional neural networks, although may also incorporate other deep generative models. As described herein, artificial neural networks for uncertainty modeling, computer vision, robotic picking, and other processes described herein first require training. A variety of different training methods may be used to train a neural network for modeling uncertainty, segmenting units, or picking and placing items in a bin in accordance with embodiments of the technology described herein.

There is inherently some degree of uncertainty that comes along with an output to a machine learning model. In many scenarios, the uncertainty goes unused or ignored. However, a neural network model able to express that uncertainty can enable decision-making based on risk tolerances or other confidence parameters associated with a task. Most computer vision based prediction models used today output a single, unimodal prediction. Single prediction models can be wrong in their results but have no way to know that they are wrong or why. The output distributions from these predictions are often not expressive enough to capture the full range of uncertainty. For critical applications, single predictions may be insufficient and provide no means for trading off confidence with other performance metrics. Thus, training models that have more expressive output distributions so that they can model uncertainty and allow decision making based on high-confidence predictions derived from predicted uncertainty distributions.

Having a representation of uncertainty can benefit machines and machine learning techniques in a wide variety of applications. One application contemplated herein is the application of uncertainty modeling to robotic picking because when a machine is going to interact with another object, it can be very useful to understand how confident a "best guess" is before attempting to interact with the object. In some examples, a neural network may express uncertainty in various relevant dimensions related to another object or an item that the robotic device intends to pick up and algorithms may then be used to operate the robot differently based on uncertainty.

Parameters of an object where it may be useful to understand how uncertain a machine is regarding the parameter may include an object's weight, physical shape, materials, size, edges, and similar parameters that a computer vision system may have uncertainty about. A traditional neural network may just produce a best guess for each of those parameters, but in scenarios where it is best to be risk averse, it can be dangerous or have consequences to take a shot in the dark if the best guess it still relative uncertain. Thus, in the present example, one or more neural networks may be used to determine the uncertainty and according affect the robot's behavior. Understanding the uncertainty associated with an action in this scenario may be important to get right because getting it wrong could cause a wide variety of negative results. For example, if a robot picks up an item to move it to another bin or conveyor belt, but accidentally picks up two items because it was incorrect regarding the shape and boundaries of the item, it can cause issues such as dropping, damaging equipment, incorrect order fulfilment, and the like.

Many scenes a robot and/or a computer vision system sees are inherently ambiguous. For example, when looking at a scene with tightly packed items, the exact boundaries of each item may not visible, or may be hard to decipher for a variety of reasons. A model that outputs only one segmentation prediction is unable to properly capture this uncertainty. Thus, embodiments of the present disclosure use latent codes and variant mask-regions with a convolutional neural network (Mask-R-CNN) to achieve high-level instance segmentation predictions, wherein the R-CNN of the present embodiments may take one or more images of a scene and identify at least one distinct object boundary. Masks may be used to label object boundaries corresponding to a given segmentation prediction. One benefit of the present approach is the ability to express uncertainty only is situations or dimensions where uncertainty exists. For example, if a scene comprises several objects that have properties making them visually distinct and easy to decipher, the system produces a segmentation prediction that has little to no uncertainty, and the plurality of guesses may be almost exactly the same. However, if a scene also comprises objects with boundaries that are difficult to decipher with computer vision, the system may advantageously use its knowledge of what is certain and what is uncertain to increase accuracy and efficiency in predictions or actions.

FIG. 1 illustrates an example of warehouse environment 100 having robotic arm 105 for picking items from a bin in accordance with some embodiments of the present technology. FIG. 1 includes robotic arm 105, bin 120, conveyor belt 125, camera 130, and camera 135. Robotic arm comprises picking element 110. Picking element 110 comprises a set of suction-based picking mechanisms, however different numbers and types of picking mechanisms may be utilized in accordance with the present embodiment. Bin 120 is holding boxes that may be found in a warehouse, commercial setting, or industrial setting. Many other types of items may be in a bin or similar container for picking in accordance with the present embodiment. In the present example, robotic arm 105 is a six-degree-of-freedom (6DOF) robotic arm. Picking element 110 is designed for picking items out of bin 120 and placing them onto compartments of conveyor belt 125.

An autonomous robot may benefit from having a means for recognizing the environment around it and processing that information to come up with a way to perform a task. Thus, if a robot is picking items out of a bin, its ability to sense the location and position of a specific item and apply that to determine how to pick up the item and move it to a desired location is beneficial. A robot capable of sensing and applying that knowledge, even within highly repetitive settings, dramatically decreases the need for human intervention, manipulation, and assistance. Thus, human presence may no longer be required when items aren't perfectly stacked or when a robot gets stuck, as a few examples. If a robot regularly gets stuck, it may defeat the purpose of using a robot altogether, because humans may be required to frequently assist the robot.

In some examples, robotic arm 105 and picking element 110 may pick boxes from bin 120 one at a time according to orders received and place the items on the conveyor belt for packaging or place them into packages for shipment. Furthermore, robotic arm 105 and picking element 110 may be responsible for picking items from various locations in addition to bin 120. For example, several bins comprising different merchandise may be located in proximity to robotic arm 105, and robotic arm 105 may fulfill requests for the different pieces of merchandise by picking the correct type of merchandise and placing it onto conveyor belt 125.

Picking element 110 may comprise one or more picking mechanisms for grabbing items in a bin. Picking mechanisms may include one or more suction mechanisms, gripping mechanisms, robotic hands, pinching mechanisms, magnets, or any other picking mechanisms that could be used in accordance with the present disclosure. In some examples, picking element 110 may be additionally used for perturbation, such as poking, touching, stirring, or otherwise moving any items in bin 120, as just a few examples. In further examples, robotic arm 105 may comprise a perturbation element such as a pneumatic air valve connected to a pneumatic air supply, wherein the pneumatic air valve blows compressed air into bins in certain situations. A perturbation sequence may be used in situations where the DNN or another model determines that there is low probability that it will be able to pick up any items in bin 120 as they are presently arranged. In some examples, the robotic arm may have already tried and failed to pick every visible item in the bin, and therefore decides to initiate a perturbation sequence. Robotic arm 105 may move and position picking element 110 such that it is able to pick up an item in bin 120. In certain embodiments, determining which item to pick up and how to pick it up is determined using at least one deep artificial neural network. The deep neural network (DNN) may be trained to guide item pick-up and determine which items have the greatest probabilities of pick-up success. In other embodiments, picking may be guided by a program that does not use a DNN for decision making.

A computer vision system in accordance with embodiments herein may comprise any number of visual instruments, such as cameras or scanners, in order to guide motion, picking, and uncertainty modeling a computer vision system receives visual information and provides it to a computing system for analysis. Based on the visual information provided by the computer vision system, the system can guide motions and actions taken by robotic arm 105. A computer vision system may provide information that can be used to decipher geometries, material properties, distinct items (segmentation), bin boundaries, and other visual information related to picking items from a bin. Based on this information, the system may decide which item to attempt to pick up and can then use the computer vision system to guide robotic arm 105 to the item. A computer vision system may also be used to determine that items in the bin should be perturbed in order to provide a higher probability of picking success. A computer vision system may be in a variety of locations allowing it can properly view bin 120 from, either coupled to or separate from robotic arm 105. In some examples, a computer vision system may be mounted to a component of robotic arm 105 from which it can view bin 120 or may be separate from the robotic device.

Camera 130 images the contents of bin 120 and camera 135 images a region of conveyor belt 125. Each of camera 130 and camera 135 may comprise one or more cameras. In some examples, a camera in accordance with the present example such as camera 130 comprises an array of cameras for imaging a scene such as bin 120. Camera 130 and camera 135 are part of a computer vision system associated with robotic arm 105 such as a computer vision system in accordance with the technology disclosed herein.

In the example of FIG. 1, robotic arm 105 has successfully picked box 115 from bin 120 and is in the process of moving box 115 to conveyor belt 125. The computer vision system including camera 130 may help guide robotic arm 105 when picking box 115. In some examples, before picking box 115, the computer vision system images the contents of bin 120, performs a segmentation sequence using the images, and identifies box 115 for picking based on the segmentation results. Based on the uncertainty model and distribution of segmentation predictions, the system of FIG. 1 determined that the uncertainties associated with box 115 were not beyond a confidence tolerance and therefore that the robot may attempt to pick box 115. Robotic arm 105 may subsequently place box 115 onto conveyor belt 125 for distribution.

Many scenes a computer vision system sees are inherently ambiguous, such as a scene with tightly packed boxes or a single-sku bin where the items are difficult to tell apart. In a scene with matching boxes, such as in the present example, some dimensions of each box do not have enough visual information available to accurately predict the size every time. A model that outputs a single prediction would not be able to properly capture this uncertainty. In the case of segmentation, there are often regions of an image which are more likely to be an object that others. To find regions that are confidently objects, samples may be taken from a model of the image and then used to efficiently find the largest regions with a minimum amount of overlap. In some examples, object boundaries may be chosen based on a minimum percentage of agreement that a region is contained in an object. The flexibility of an adjustable percentage enables a tradeoff between being conservative in estimates with other performance metrics. For example, in some applications, double picks may be more costly or consequential than others. In a scenario where it is important to be cautious and avoid double picks, a high amount of agreement can be required, such as 95%, before a system attempts to interact with an object, to reduce that chance of picking two items on accident. In other settings, additional resources may be available such as a scale to help detect double picks, so a lower confidence tolerance may be set which allows for more pickable area.

The uncertainty modeling used in accordance with FIG. 1 advantageously uses expressive output distributions to capture the full range of uncertainty associated with segmenting an image and then uses the distributions to make tunable confidence predictions that are well calibrated with the real world. A calibrated confidence prediction may be, for example, that the system must be 90% confident in the segmentation of an object before it attempts to pick the item and the prediction will be correct 90% of the time. In some examples, the downside of being incorrect about the dimensions of an object is large, and therefore if the system is uncertain about the object, it may be better to leave the object rather than picking it and allow a human operator to interact with the object instead. Alternatively, if there is a low confidence prediction before going to pick an item, it may allow the machine to act with a larger margin of error. For example, if the item may be smaller than predicted and the system is relatively uncertain of its boundaries, it may pick the item from a region of greatest certainty to avoid the risk of accidentally picking two items.

Segmentation plays an important role in warehouse environments and robotic picking such as in the example of FIG. 1. Different scenarios can be extremely difficult to segment, especially when everything in a scene looks almost identical, has the same pattern, has overlapping objects, or similar scenarios. When a computer vision system images a scene, it collects pixels with intensity and color, but fails to gather information related to an understanding of the situation such as observing distinct objects next to each other. A computer vision system guided by a neural network can make a best guess at how to segment multiple items in an image but may not be able to determine if it is correct. There are many ways for a computer vision system to differentiate pixels from each other in an attempt to segment and image and there are lots of ways to fail at correctly segmenting images. Some scenarios may have high consequences for being wrong and taking action anyway, so the ability to model uncertainty in segmentation predictions can be extremely useful when determining whether or not to attempt to pick up an item. An incorrect understanding of a scene and the objects within in can cause an accidental pick up of multiple objects, thereby providing more items than requested or purchased in an order or causing a failed pick up by identifying a single object as multiple objects.

Figure 2:
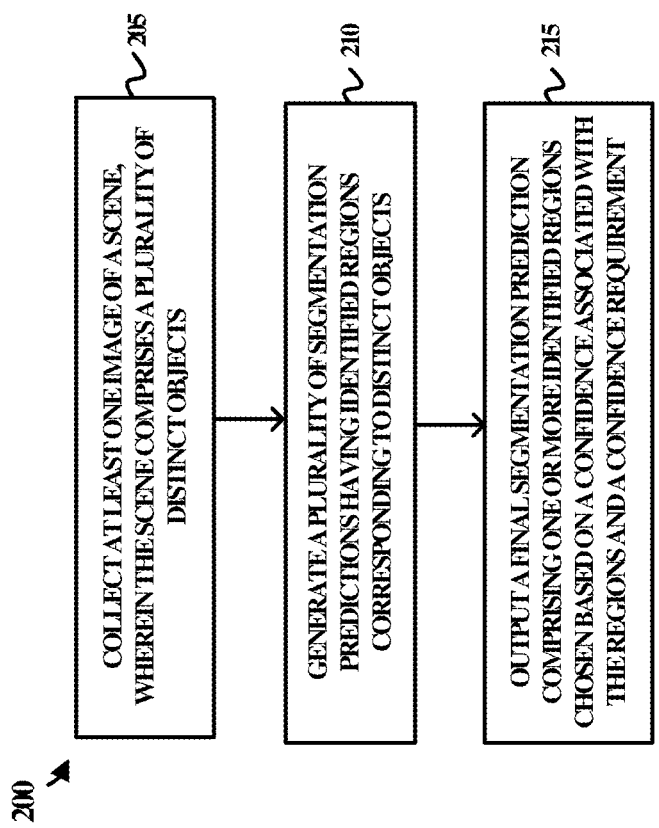
FIG. 2 is a flow chart with a series of steps for modeling uncertainty in accordance with some embodiments of the present technology.

FIG. 2 shows process 200 for uncertainty modeling as it applies to instance segmentation. In step 205, a computer vision system collects at least one image of a scene, wherein the scene comprises a plurality of distinct object.

FIG. 2 is a flow chart illustrating a series of steps for modeling uncertainty during instance segmentation in accordance with some embodiments of the present technology. In step 205, a computer vision system collects at least one image of a scene, wherein the scene comprises a plurality of distinct objects. In some examples, the computer vision system may be the computer vision system including one or both of cameras 130 and 135 from FIG. 1. The plurality of distinct object may be items from a bin, such as the contents of box 115. In some implementations, one or more RGB images are captured and fed into a depth model for mapping depth in the image using one or more neural networks.

In step 210, the computer vision system generates a plurality of segmentation predictions having identified regions corresponding to distinct objects. In some examples, identified regions are represented as object masks. A mask may be any label or representation illustrating a region of a distinct item in the image. Using an object mask, an RGB map, and a depth map, the system may generate segmentation predictions by determining which pixels belong to distinct objects. In the present example, a trained autoregressive model is used to produce segmentation predictions based on a random input such as time. The system may recursively generate segmentation predictions based on the random input until a satisfactory number of predictions has been produced. Each prediction may be generated based on a random seed or based on time, in some implementations.

In step 215, the computer vision system outputs a final segmentation prediction comprising one or more identified regions chosen based on a confidence associated with the regions and a confidence requirement. The identified regions represent predicted regions of an object. In some examples, the outputted regions may form a boundary around the object, while in other examples, the outputted regions may represent parts of an object that the system has identified as likely to correspond to a single object. The final segmentation may be different from any single segmentation prediction from step 210 in some examples. The final segmentation may be an aggregate of regions derived from the predictions in step 210, where regions with frequent overlap, such as 90% of the time for a 90% confidence requirement, are shown. In scenes without much uncertainty, such as in the example of FIG. 7, the predictions from step 210 may all be very similar or the same and the final segmentation output in step 215 may therefore be very similar or the same as the predictions from step 210.

Figure 3:
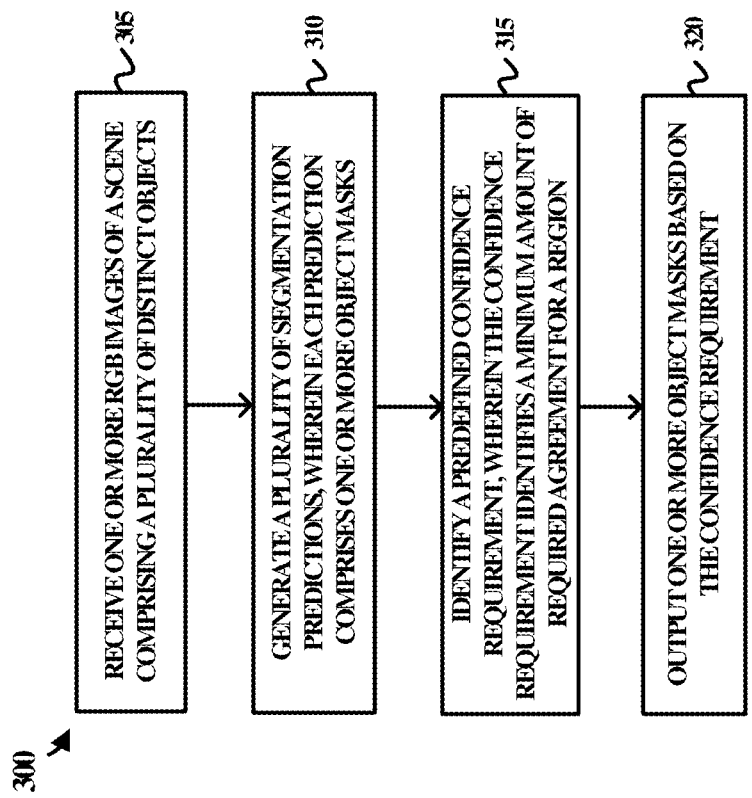
FIG. 3 is a flow chart with a series of steps for modeling uncertainty in accordance with some embodiments of the present technology.

FIG. 3 shows process 300 for segmenting images and modeling uncertainty in accordance with some embodiments of the present technology. In step 305, an image segmentation system receives one or more RGB images of a scene comprising a plurality of distinct objects. Segmentation may be applied to a variety of applications, especially in applications in which a quantification of uncertainty may play a useful role in image processing. In step 310, the image segmentation system generates a plurality of segmentation predictions, wherein each prediction comprises one or more object masks. Most computer vision models output a single prediction. However, the autoregressive instance segmentation model disclosed herein uses latent codes with variant Mask-R-CNN to achieve advanced instance segmentation and perform post-processing to find a confidence associated with different items.

Variations of predictions may come from one or more neural networks that use random numbers every time they are run, wherein each run corresponds to a single prediction. Based on the random number, the neural network should have a different output each time, unless the scene has no uncertainty associated with it. Using a latent variable model, the model can be run many times to get a distribution of outputs. In each iteration, a trained neural net will output a single, reasonable segmentation of the scene. After many iterations, such as hundreds in some examples, elements of the predictions that are more likely will have commonly appeared and elements that are unlikely will appear less often. After many iterations, the distribution will become proportional to scenarios that the neural net was trained, allowing for the recovery of what is likely and what is unlikely.

In step 315, the image segmentation system identifies a predefined confidence requirement, wherein the confidence requirement identifies a minimum amount of required agreement for a region. As discussed previously, there may be scenarios in which a system should not output regions that they are not confident about, because of the high consequences associated with the scenario or any other risk tolerance. In other scenarios, it may be okay for the system to use less confident guesses. In step 320, the image segmentation system outputs one or more object masks based on the confidence requirement. For example, if the system should only output regions that it is 95% confident about then only regions will be output that 95% of the predictions agreed upon.

Figure 4:
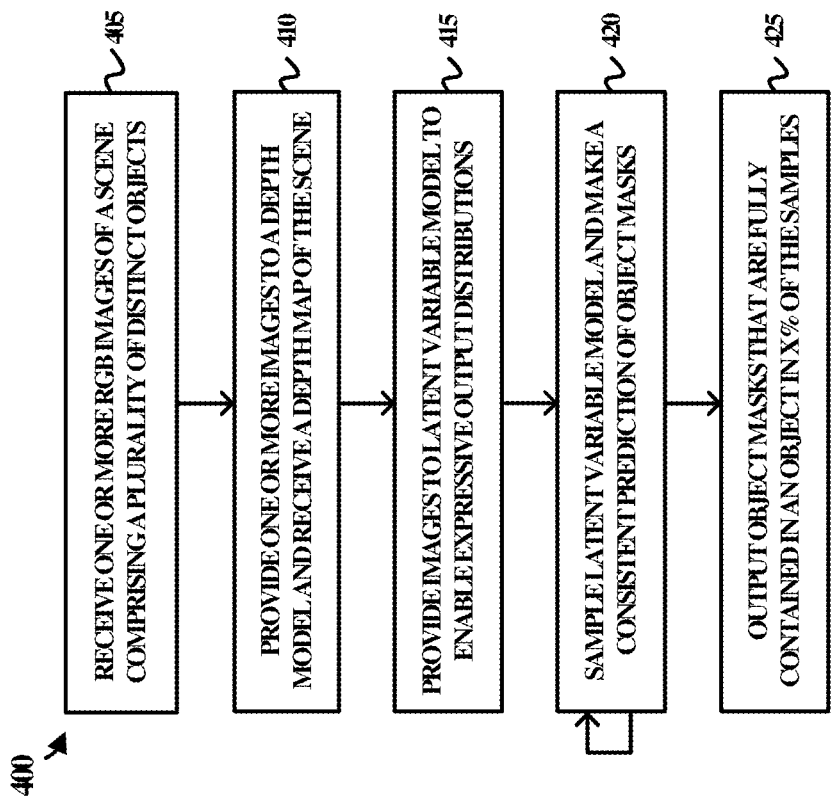
FIG. 4 is a flow chart with a series of steps for modeling uncertainty in accordance with some embodiments of the present technology.

FIG. 4 shows process 400 for image segmentation and uncertainty modeling in accordance with some embodiments of the present technology. In step 405, a modeling system receives one or more RGB images of a scene comprising a plurality of distinct objects. In step 410, the one or more images are provided to a depth model and a depth map of the scene is returned. In step 415, the modeling system provides the images to a latent variable model to enable expressive output distributions. Most computer vision models output a single prediction. However, the autoregressive instance segmentation model disclosed herein uses latent codes with variant Mask-R-CNN to achieve advanced instance segmentation and perform post-processing to find a confidence associated with different items. In step 420, the modeling system samples the latent variable model and makes a consistent prediction of one or more object masks in the scene. Step 420 may repeat until a satisfactory number of predictions have been produced. In some embodiments, a set number of predictions may be produced while in other embodiments there may a varying number of predictions produced based on an uncertainty associated with the predictions or a similar factor.

In step 425, after a full set of object mask predictions have been generated, the modeling system outputs object masks that are fully contained in an object in x % of the samples. In the present example x % represents any certainty tolerance associated with a given scenario. As previously discussed, the outputted object masks may not be identical to any of the predicted object masks in step 420. The regions of high overlap may be output in step 425. In an example, the output regions may be any region that x % of segmentation predictions agree on.

A neural network for segmentation predictions, in some examples, may be trained on simulated data wherein virtual objects with known sizes and locations are segmented. The present technology does not require prior knowledge about segmented objects, such as from inventory data or a database. When the system first observes a scene, it considers the variety of different options for how the scene could be segmented, in addition to other considerations. The model may predict a finite number of guesses, such as 500, for example.

The technology described herein should not be limited to robotic picking applications. The present technology has many applications in which a means for modeling uncertainty related to the outputs of neural networks is useful.

Figure 5:
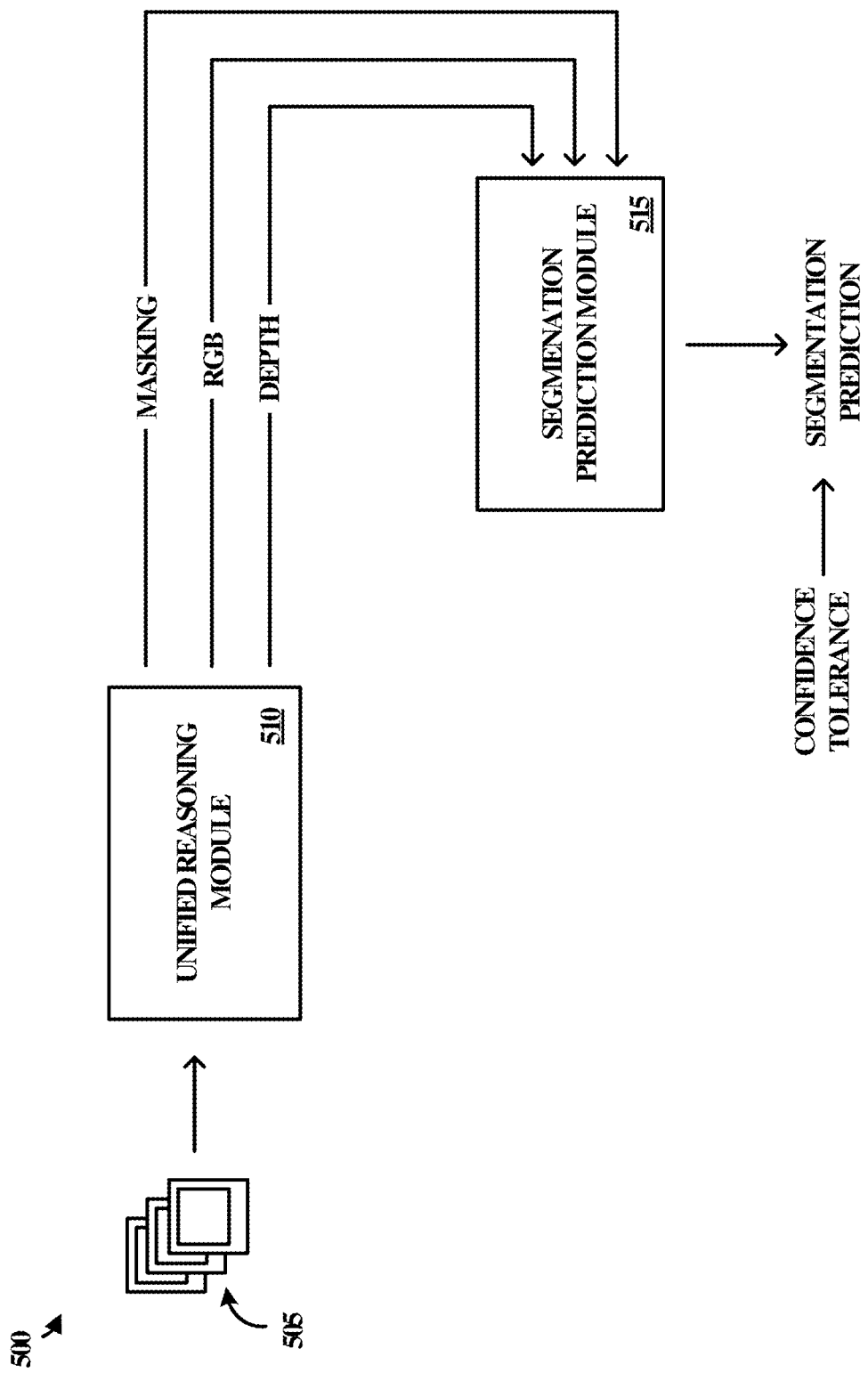
FIG. 5 illustrates an example of a process for image segmentation with neural networks in accordance with some embodiments of the present technology.

FIG. 5 illustrates an example flow within segmentation environment 500 in accordance with some embodiments of the present technology. In the present example, images 505 are used as input to and processed in unified reasoning module 510. Images 505 may be one or more images taken by an imaging or computer vision system. Images 505, in the present example, are collected by at least one camera in communication with a robotic arm, as is exemplified in FIG. 1. The images are processed in unified reasoning module 510. In some examples, unified reasoning model comprises at least one deep neural network trained for analyzing images. In the present example, image analysis includes performing segmentation and masking, RGB mapping, and depth mapping. However, fewer or additional image analysis processes may be included in unified reasoning module 510 and are anticipated.

Masking includes deciphering one or more distinct objects in images 505. Masking may include a variety of sub-processes to assist in finding distinct objects and their boundaries. Understanding depth and RGB properties for each object may assist in segmentation and masking and may also assist when it is time to approach and pick up an item with a robotic device. Although masking, RGB, and depth are illustrated as individual outputs for the purpose of illustration, the outputs of unified reasoning module 510 may be a single, unified model comprising information related to the various types of data discussed or a variation or combination of the outputted data.

The output or outputs of unified reasoning module 510 serves as input to segmentation prediction module 515. Segmentation prediction module 515 may process the unified model provided by unified reasoning module 510 to produce a set of predicted masks and/or shapes representing objects. The masks represent a proposed area encompassing an object. Since many scenes a computer vision system sees are inherently ambiguous, a model that outputs a single prediction won't be able to properly capture uncertainty. In a scene with many of the exact same item with complex patterns it may be difficult to find boundaries between items. However, an autoregressive model can properly model the distribution of segmentation possibilities. Using samples from the autoregressive model, segmentation possibilities can be efficiently computed, wherein each segmentation possibility represents one reasonable prediction of where distinct objects exist in images 505.

Once a set of segmentation outcomes has been generated representing a distribution of segmentation possibilities, a variety of different methods may be employed to give a probabilistic meaning to segmented regions in the predictions, such as an associated certainty. In one example, areas or regions of the images may be used to find areas where a certain percentage of the segmentation predictions agree or overlap. For example, if it determined that the system should avoid trying to pick an object if it is less than 80% confident in a region, then it may be a requirement that 80% of the predictions share a segmentation region before trying to pick from that area. Thus, in the final step, a segmentation prediction is output based on the defined confidence tolerance for a given situation.

Figure 6:
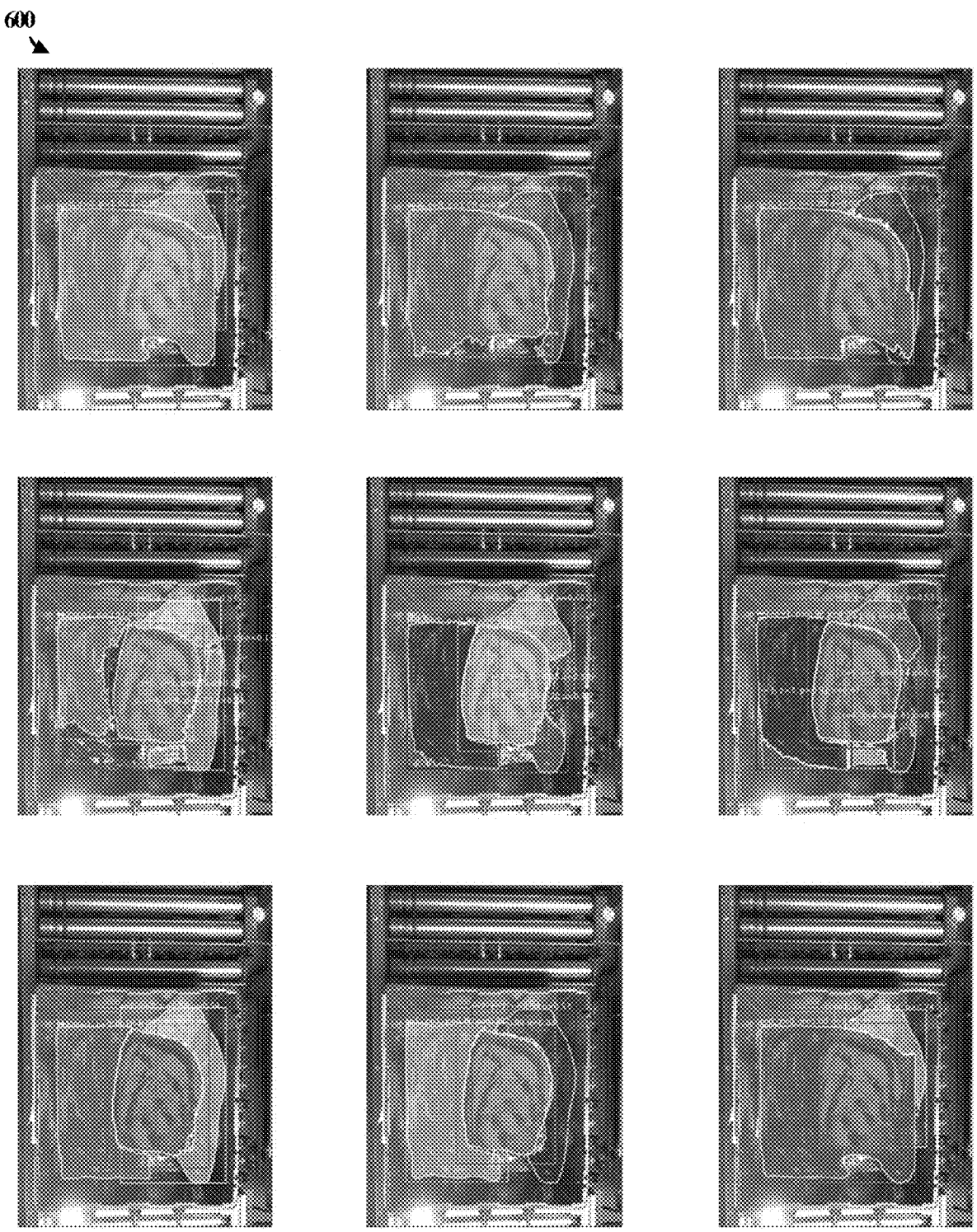
FIG. 6 illustrates examples of instance segmentation predictions in accordance with some embodiments of the present technology.

FIG. 6 shows segmentation hypothesis array 600 comprising nine segmentation hypotheses for the same scene. In some scenarios, there is some inherent ambiguity, and a computer vision system may not be able to determine a segmentation of an image with certainty. However, using trained DNNs, that same system may be useful for outputting a large number of hypotheses, wherein the distribution of outputs can show a likelihood or a certainty about instances in the hypotheses. Masks are used to show the predicted shapes of distinct objects in each hypothesis of FIG. 6. The masks are regions of color outlined in white, although the colors filling the masks are solely for purposes of illustration and are arbitrary in regard to the present example. As can be seen in FIG. 6, there are some regions and shapes that appear in many or most of the hypotheses. FIG. 6 also illustrates that certain shapes may be combined into larger shapes in some hypotheses.

One benefit of the present technology is that in scenarios similar to FIG. 6, there may be areas where nearly all hypotheses agree, and the system can therefore be certain about those regions. However, in regions with less agreement, a large distribution of proposed segmentations can be leveraged to determine what is more certain and what is less certain. Based on how much the images of FIG. 6 agree with one another, the scene can be described using a metric that represents uncertainty. As previously discussed, this metric may be compared to a confidence requirement for a given scenario to make a decision or arrive at a final segmentation proposal. By changing how much agreement is required (i.e., by changing the confidence requirement), the system may produce a more conservative segmentation proposal or a less conservative segmentation proposal.

Figure 7:
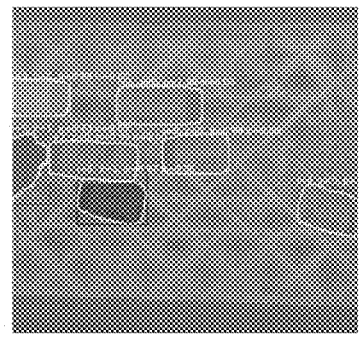
FIG. 7 illustrates examples of instance segmentation prediction in accordance with some embodiments of the present technology.
Figure 7:
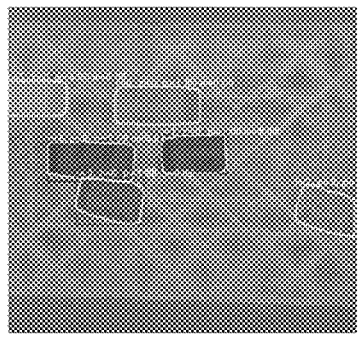
Figure 7:
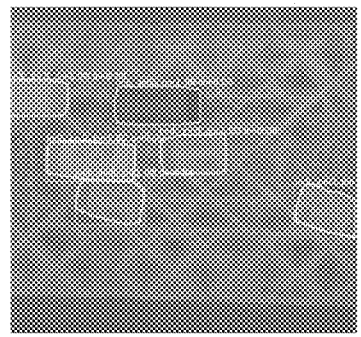
Figure 7:
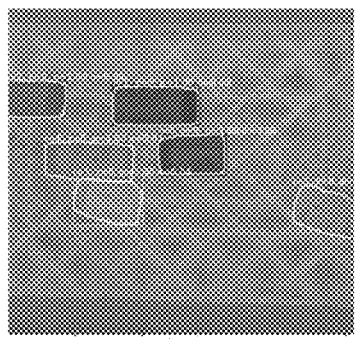
Figure 7:
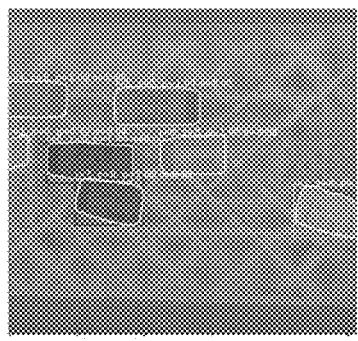
Figure 7:
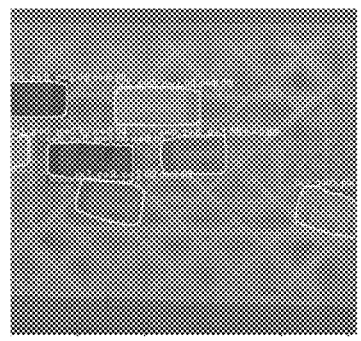
Figure 7:
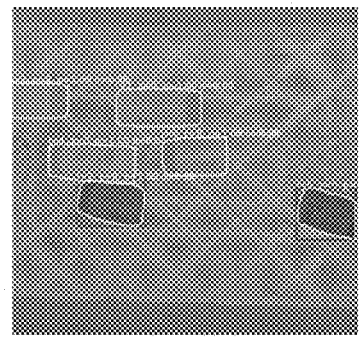
Figure 7:
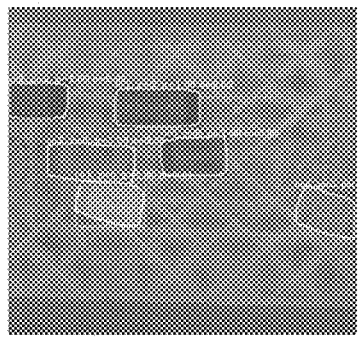
Figure 7:
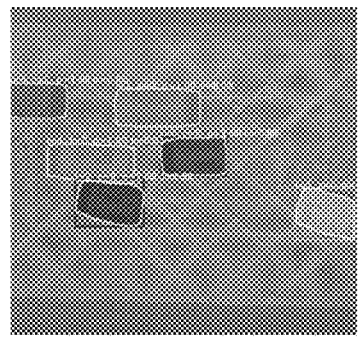

FIG. 7 shows segmentation hypothesis array 700 comprising nine segmentation hypotheses of the same scene. However, contrary to the scene of FIG. 6, the scene in FIG. 7 has very little associated uncertainty. The masked items from the hypotheses of FIG. 7 are distinct shapes that barely touch one another, making it simple for the system to identify their shapes and draw masks with great certainty. The masks drawn in the nine segmentation hypotheses of FIG. 7 change very little between each proposed segmentation, indicating that there is much less uncertainty associated with what the system can see as compared to FIG. 6. There is relatively little ambiguous nature about how to segment the scene in FIG. 7 and the predictions are nearly identical for that reason.

FIG. 7 illustrates that the present technology is useful for understanding both uncertainty and certainty. Using a distribution of possible outcomes does not tradeoff performance in scenarios that are very certain. In fact, the distribution of outcomes enables the system to understand when it is certain and provide an outcome or perform accordingly. While a unimodal prediction system may produce a segmentation hypothesis that is similar to one of the hypotheses in FIG. 7, it would have no means for understanding how certain it is about its prediction, or how straightforward the scene is for segmentation purposes.

Figure 8A:
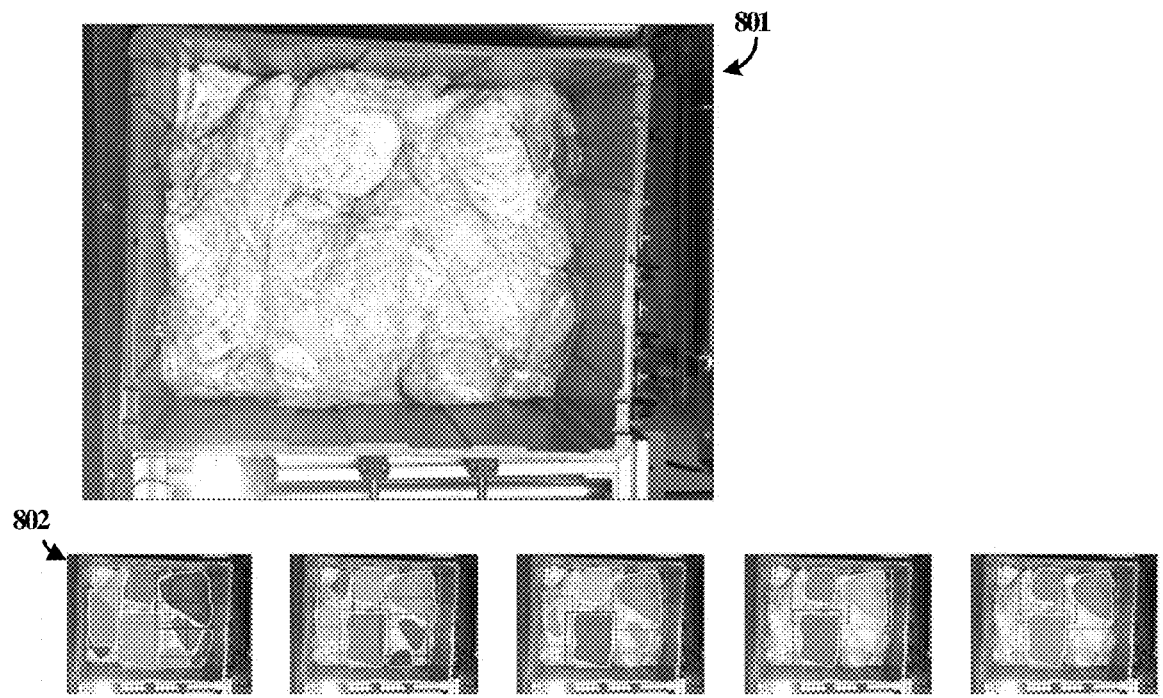
FIGS. 8A-8J illustrate examples of instance segmentation of various scenes in accordance with some embodiments of the present technology.

FIGS. 8A-8J show bin segmentation examples across several different scenarios. FIG. 8A shows an image of a bin comprising individual bags of product (image 801) along with five segmentation hypotheses found in post-processing procedures below the image (image array 802). The scenario of FIG. 8A is relatively difficult because the bags of product blend together and are difficult to tell apart. The boundaries between objects may be difficult for a computer vision system to decipher, but some regions of the image may be relatively straightforward and easy to segment. The segmentation hypotheses (image array 802) shown are in order from less conservative (farthest left) to more conservative (farthest right). It can be seen in FIG. 8A that as the segmentation hypotheses become more conservative, more items are filtered out and fewer object regions are shown. In addition to showing fewer object masks as the hypotheses get more conservative (move to the right), the object masks shrink, thereby moving away from the boundaries between objects. This shrinking away from the boundaries is a result of being less confident as to where the item boundaries are.

Figure 8B:
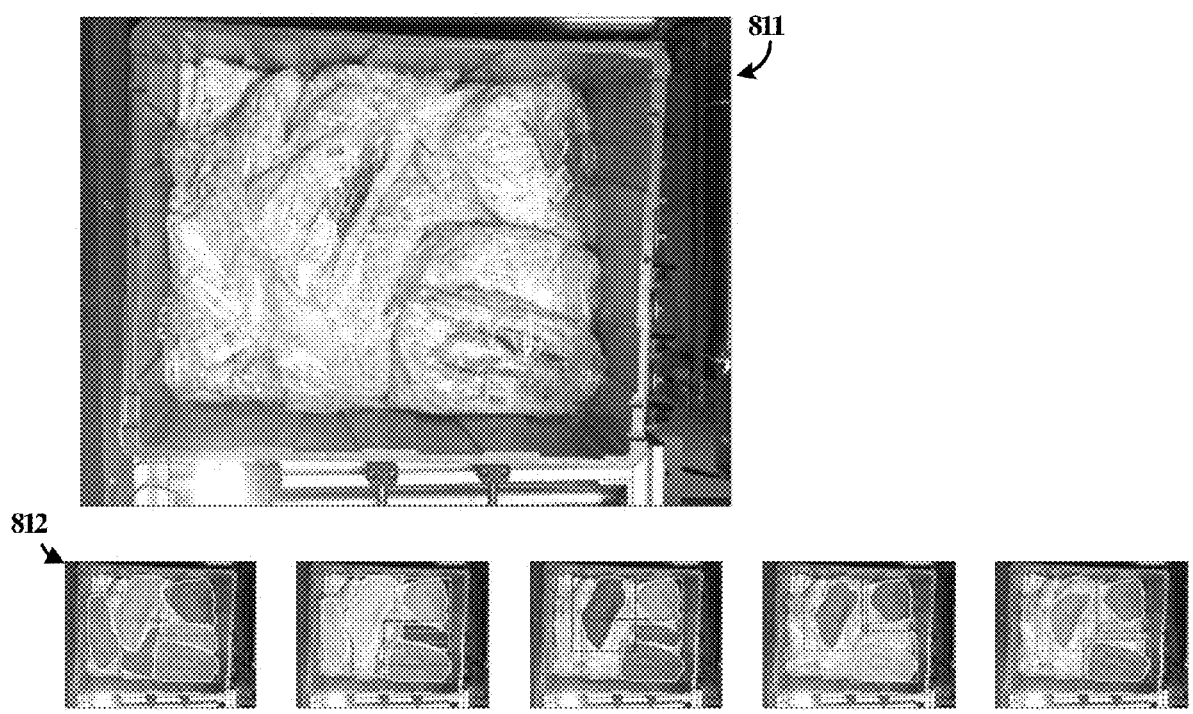
Figure 8C:
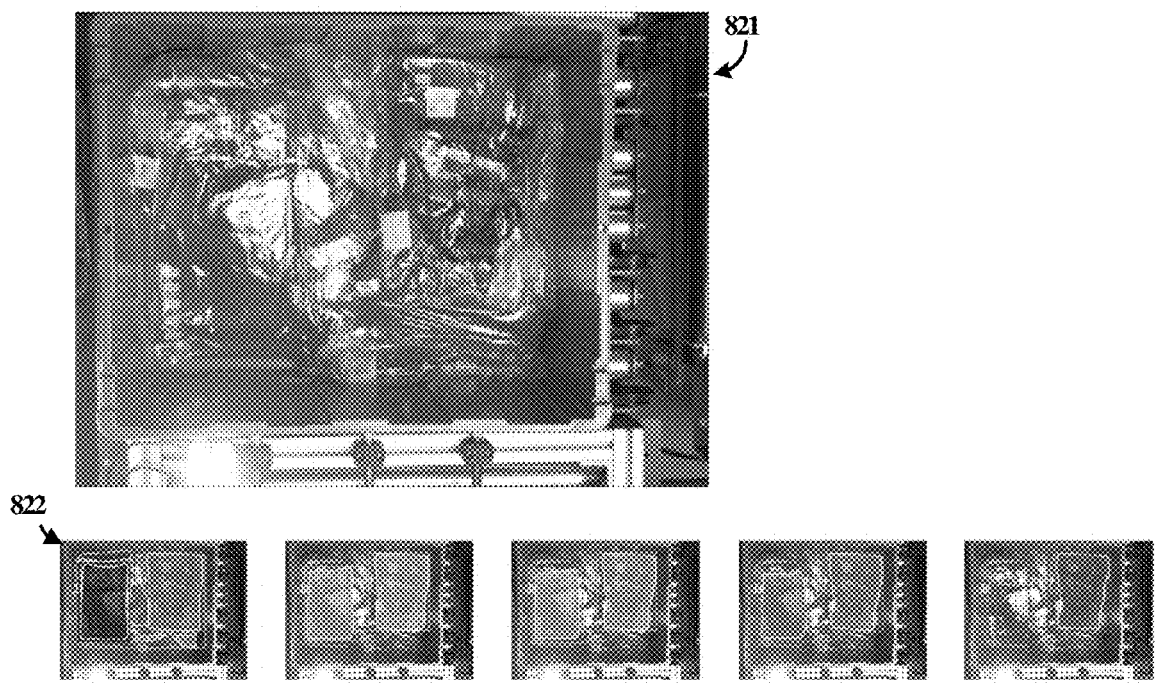
Figure 8D:
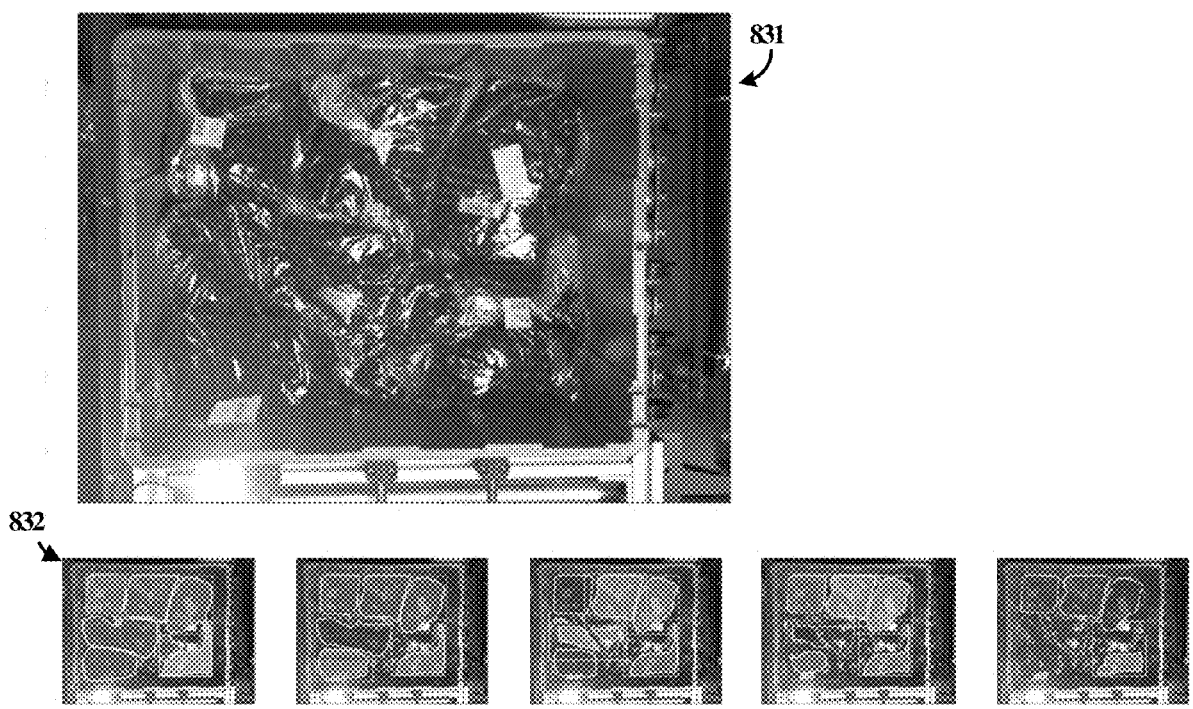

FIG. 8B includes image 811 showing a bin comprising individual bags of product in a different arrangement from those in image 801. FIG. 8B further includes image array 812 showing a series of segmentation hypotheses ranging from less conservative predictions (farthest left) with an increase in conservativeness in images to the right, the farthest right image being the most conservative prediction of image array 812. FIG. 8C includes image 821 showing a bin comprising individual bags of product. FIG. 8C further includes image array 822 showing a series of segmentation hypotheses ranging from less conservative predictions (farthest left) with an increase in conservativeness in images to the right, the farthest right image being the most conservative prediction of image array 822. FIG. 8D includes image 831 showing a bin comprising individual bags of product in a different arrangement from those in image 821. FIG. 8C further includes image array 832 showing a series of segmentation hypotheses ranging from less conservative predictions (farthest left) with an increase in conservativeness in images to the right, the farthest right image being the most conservative prediction of image array 832.

Figure 8E:
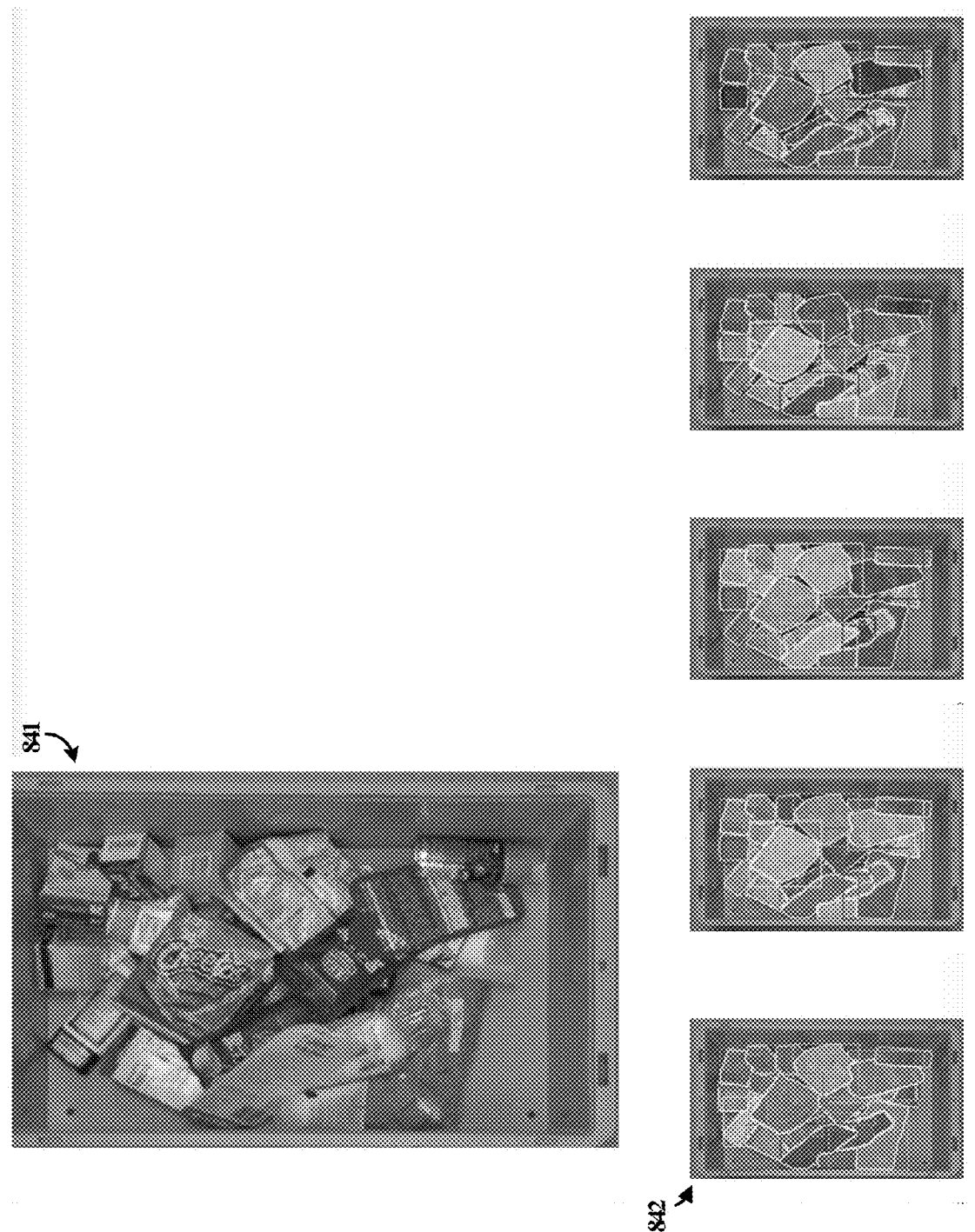

FIG. 8E shows another segmentation scenario for items in a bin. FIG. 8E illustrates an image of the contents of the bin (image 841) and five segmentation hypotheses below the image (image array 842). Similar to FIG. 7, FIG. 8E shows an example of a scenario with little associated uncertainty. The bin of the present example comprises multiple different products instead of a several of the same product, such as in FIGS. 8A-8D. The five segmentation hypotheses (image array 842) shown in FIG. 8E also move from less conservative hypotheses (far left) to the more conservative hypotheses (far right). However, unlike FIG. 8A-8D, as the hypotheses become more conservative, very few items are filtered out, indicating that there is relatively high confidence associated with the object segmentation predictions in the scene. Due to the nature of the distribution of hypotheses generated when a plurality of guesses are made, the model is able to illustrate that there is little uncertainty associated with an image if the results are all similar to one another and if object regions overlap a large percentage of the time.

Figure 8F:
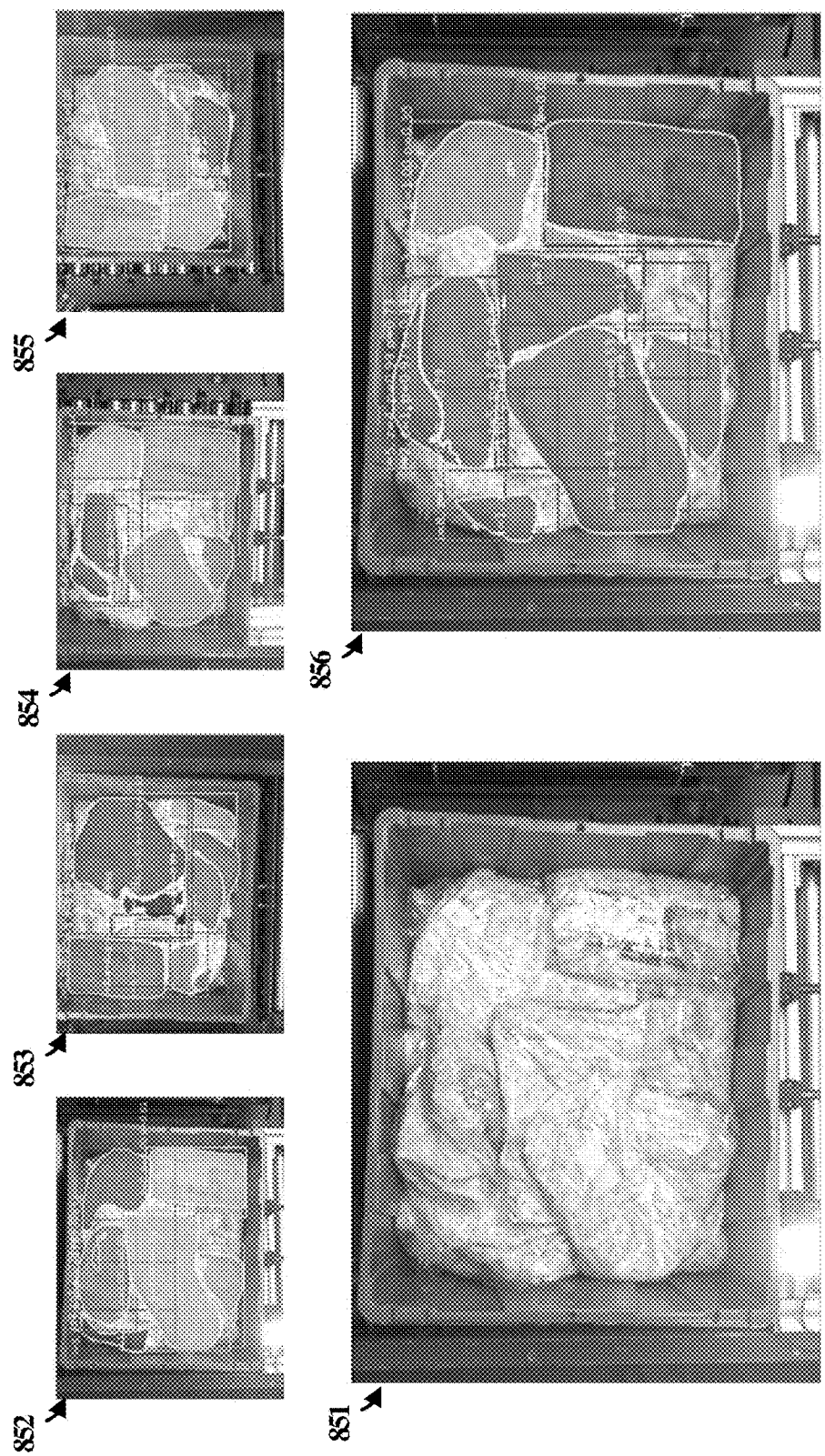

FIGS. 8F-8J show bin segmentation examples across different scenarios, with an additional comparison of single-cameras versus multiple-camera predictions. The present example illustrates how the confidence-based post-processing used in technology of the present disclosure can be useful for fusing information from multiple views. Four different camera viewpoints are used to take pictures in the present example and then segment each of the individual images. The segmentations are then combined to find objects that are the most agreed upon. In FIG. 8F, the top row of four segmentation hypotheses (e.g., image 852, image 853, image 854, and image 855) illustrates an image with overlying segmentation predictions from each of four cameras based on original image 851. Image 856 shows a fused segmentation prediction generated from the combination of image from image 852, image 853, image 854, and image 855 based on agreements or similarities between all of the views. In the present example, the segmentations predictions of image 852, image 853, image 854, and image 855 are noticeably less accurate than the agreement between all views, illustrating the benefits of using multiple views and fusing information to produce confidence-based predictions.

Figure 8G:
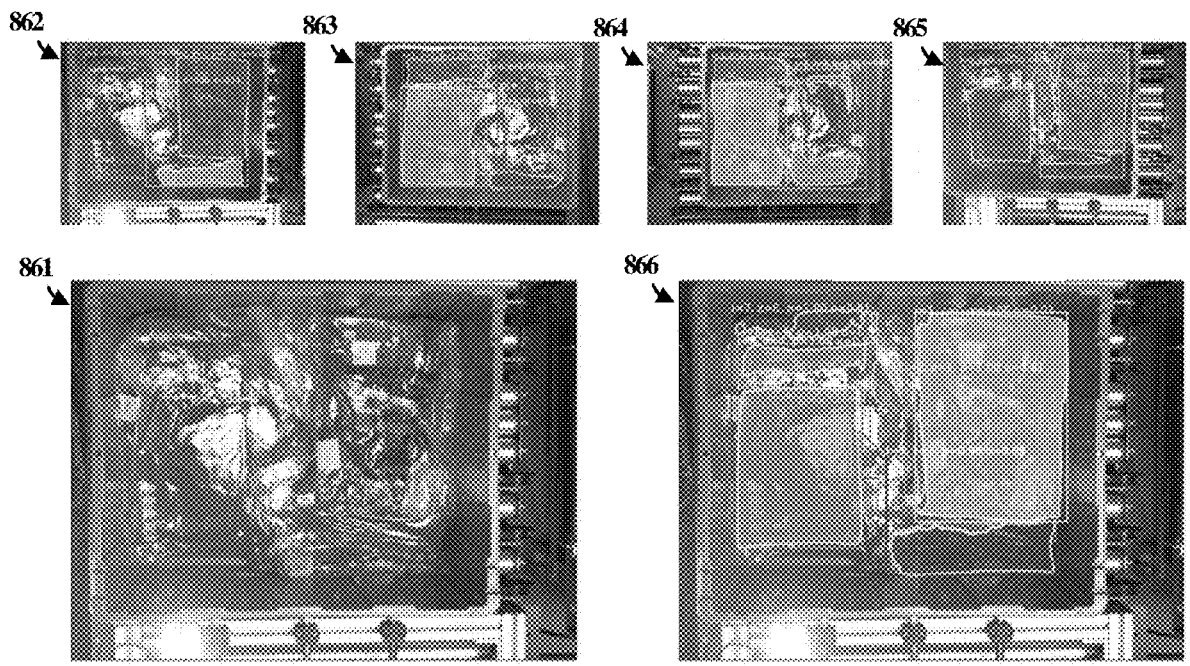
Figure 8H:
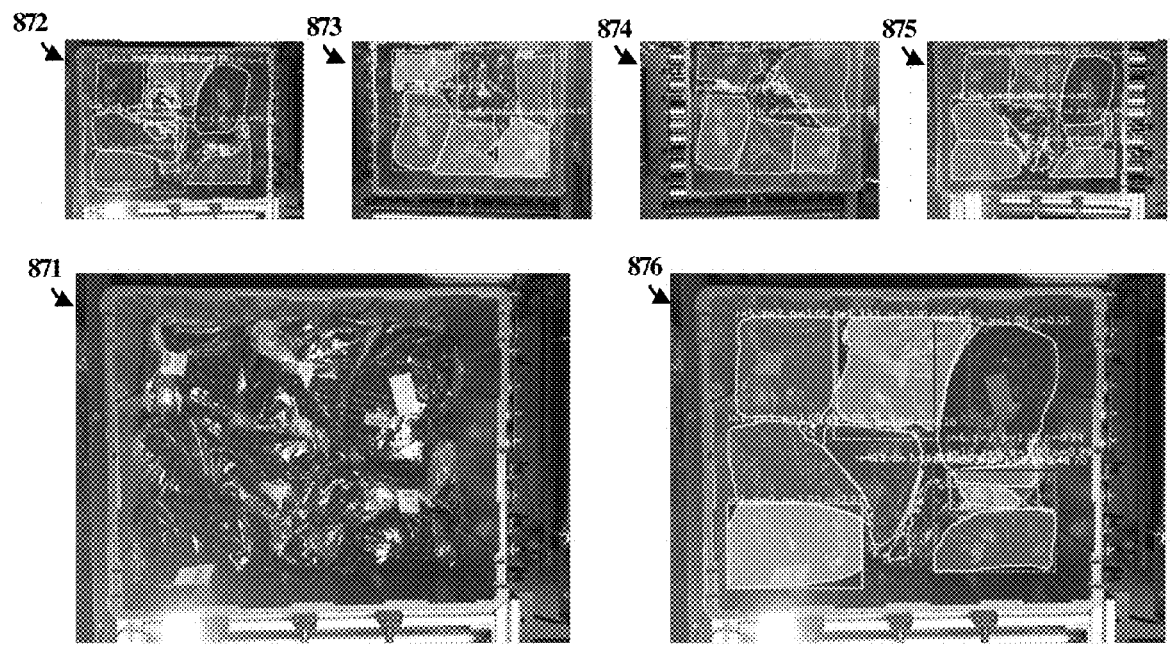

In FIG. 8G, the top row of four segmentation hypotheses (e.g., image 862, image 863, image 864, and image 865) illustrates an image with overlying segmentation predictions from each of four cameras based on original image 861. Image 866 shows a fused segmentation prediction generated from the combination of image from image 862, image 863, image 864, and image 865 based on agreements or similarities between all of the views. In the present example, the segmentations predictions of image 862, image 863, image 864, and image 865 are noticeably less accurate than the agreement between all views, further illustrating the benefits of using multiple views and fusing information to produce confidence-based predictions. In FIG. 8H. the top row of four segmentation hypotheses (e.g., image 872, image 873, image 874, and image 875) illustrates an image with overlying segmentation predictions from each of four cameras based on original image 871. Image 876 shows a fused segmentation prediction generated from the combination of image from image 872, image 873, image 874, and image 875 based on agreements or similarities between all of the views. In the present example, the segmentations predictions of image 872, image 873, image 874, and image 875 are noticeably less accurate than the agreement between all views, further illustrating the benefits of using multiple views and fusing information to produce confidence-based predictions.

Figure 8I:
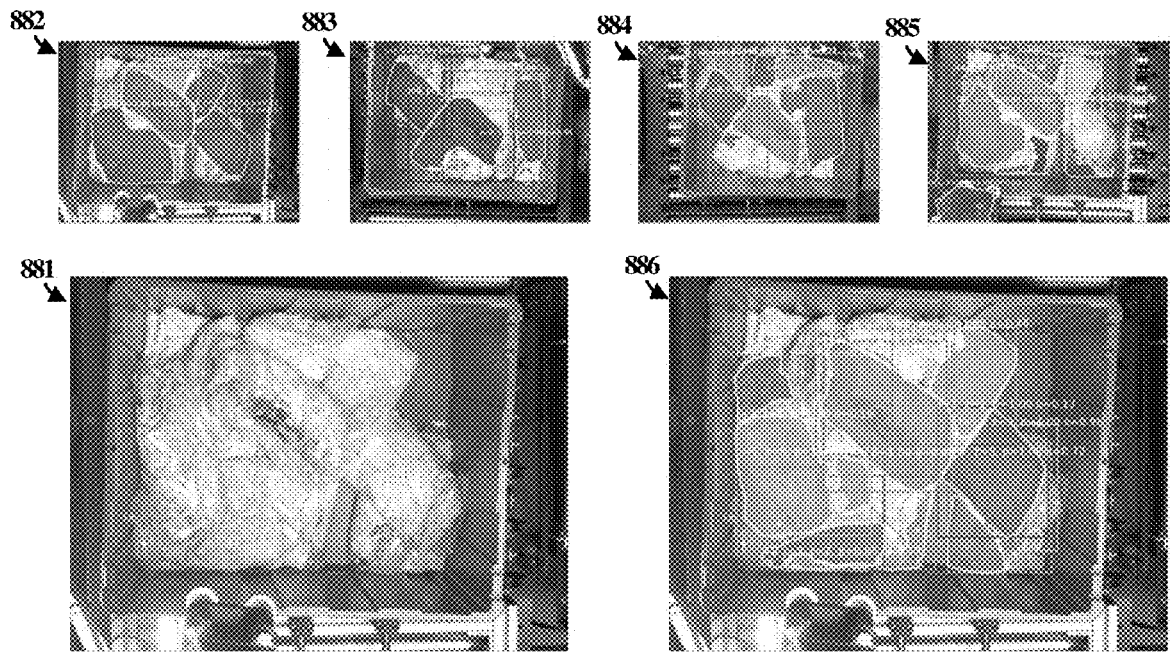
Figure 8J:
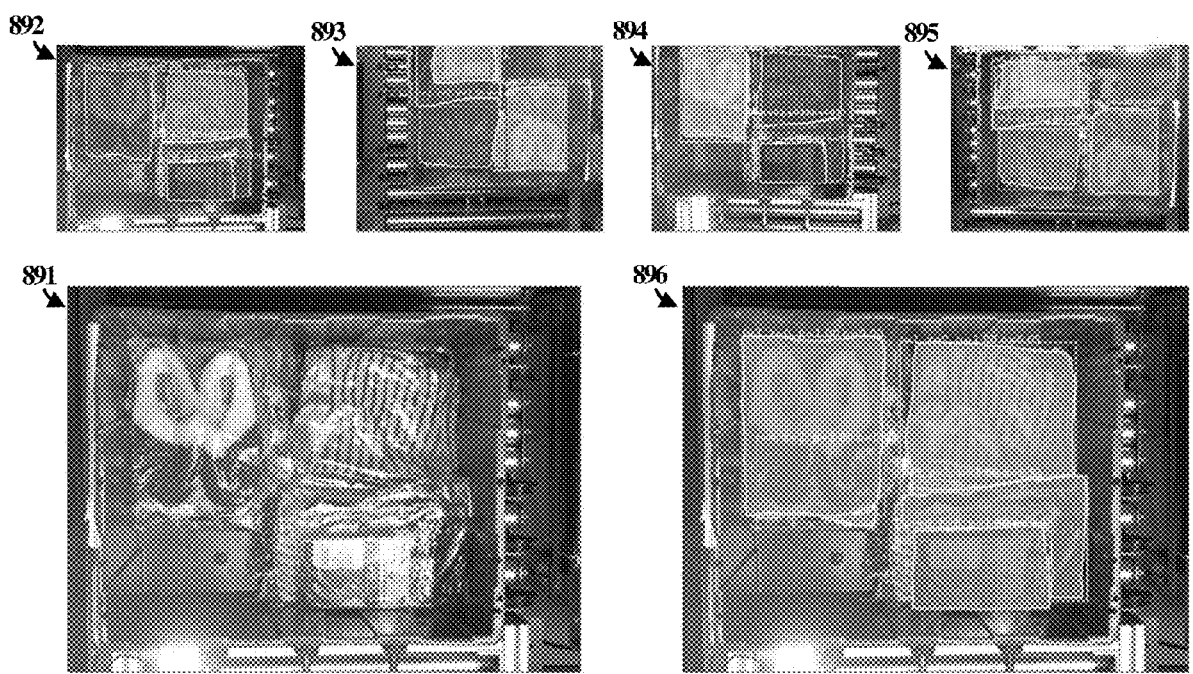

FIG. 8I, the top row of four segmentation hypotheses (e.g., image 882, image 883, image 884, and image 885) illustrates an image with overlying segmentation predictions from each of four cameras based on original image 881. Image 886 shows a fused segmentation prediction generated from the combination of image from image 882, image 883, image 884, and image 885 based on agreements or similarities between all of the views. In the present example, the segmentations predictions of image 882, image 883, image 884, and image 885 are noticeably less accurate than the agreement between all views, further illustrating the benefits of using multiple views and fusing information to produce confidence-based predictions. In FIG. 8J, the top row of four segmentation hypotheses (e.g., image 892, image 893, image 894, and image 895) illustrates an image with overlying segmentation predictions from each of four cameras based on original image 891. Image 896 shows a fused segmentation prediction generated from the combination of image from image 892, image 893, image 894, and image 895 based on agreements or similarities between all of the views. In the present example, the segmentations predictions of image 892, image 893, image 894, and image 895 are noticeably less accurate than the agreement between all views, further illustrating the benefits of using multiple views and fusing information to produce confidence-based predictions.

Figure 9A:
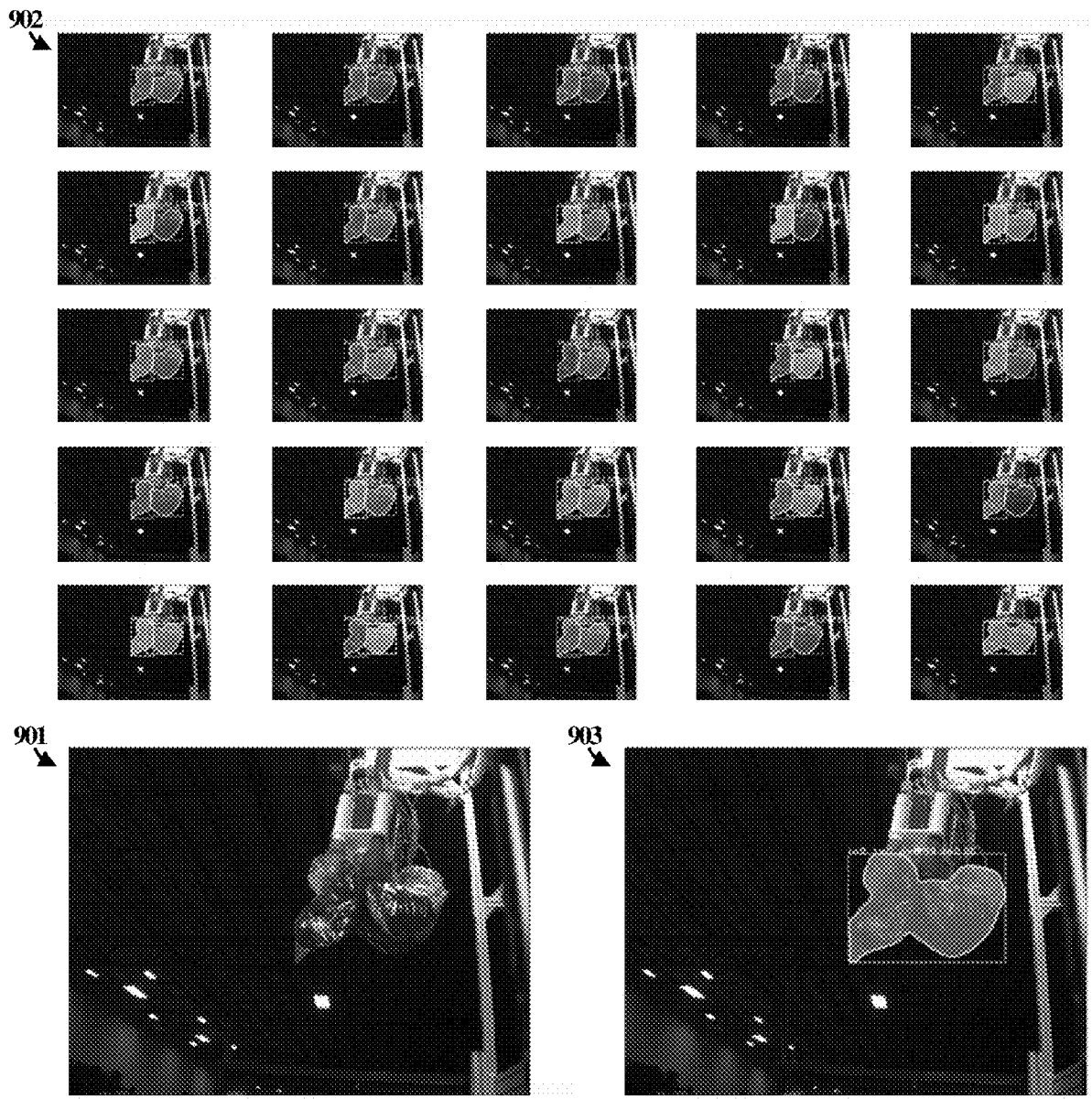
FIGS. 9A-9C illustrate example of instance segmentation for double-pick detection in accordance with some embodiments of the present technology.
Figure 9B:
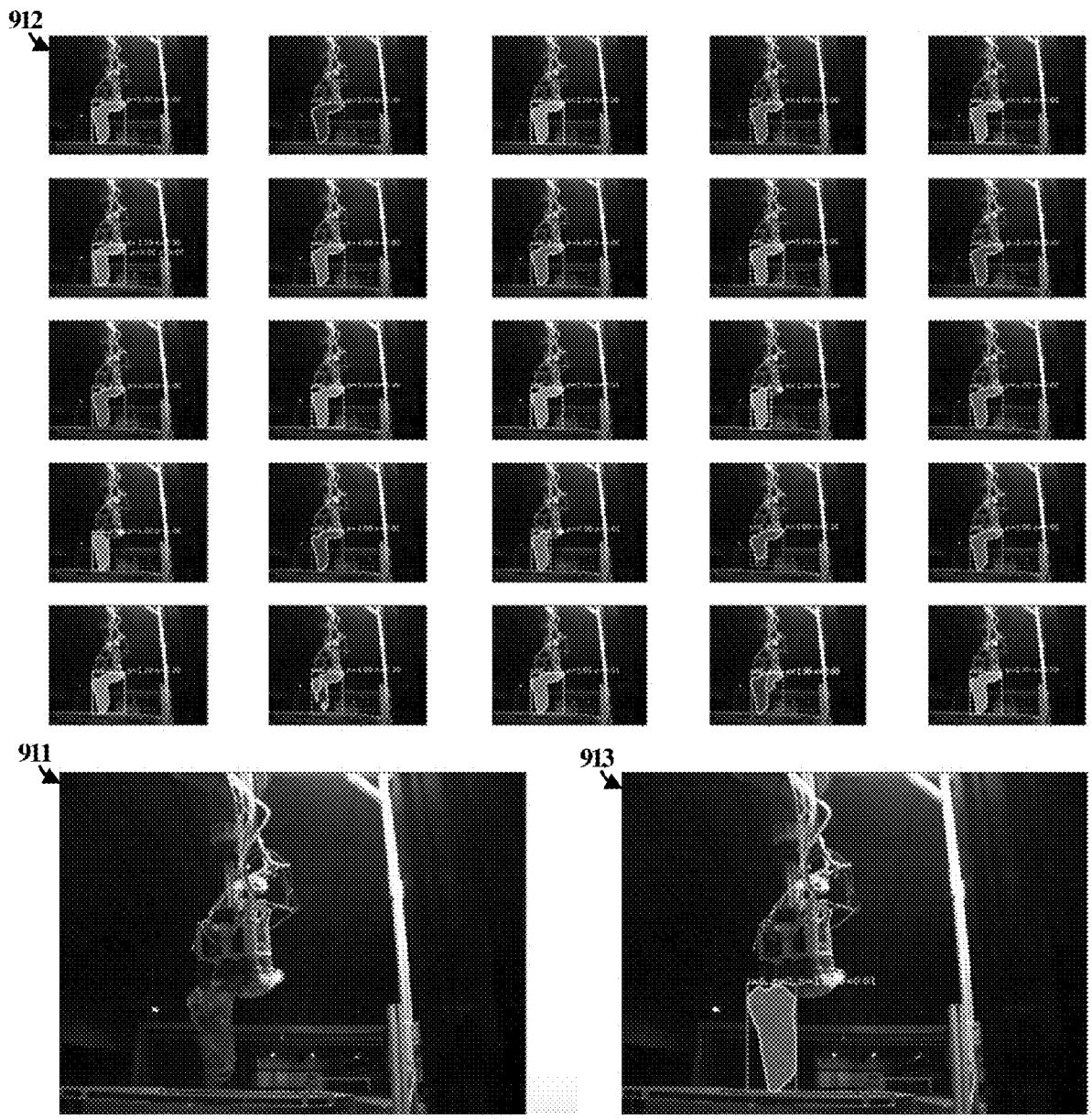
Figure 9C:

FIGS. 9A-9C illustrate the use of segmentation and uncertainty modeling technology disclosed herein for purposes of detecting double picks in a robotic picking environment such as in the example of FIG. 1. The latent segmentation model described in reference to previous Figures can be used to count a number of objects picked or held by a robotic device to prevent accidental picking of multiple items. As previously discussed, the accidental picking of multiple items can lead to incorrect order fulfilment, dropping, equipment damage, product damage, and many other negative results. In FIG. 9A, image 901 shows an original unsegmented image while image array 902 includes 25 images illustrating a set of 25 hypotheses or samples generated by the latent model. Image 903 shows the unified segmentation prediction from a unimodal prediction model based on the predictions shown in image array 902.

In FIG. 9B, image 911 shows an original unsegmented image while image array 912 includes 25 images illustrating a set of 25 hypotheses or samples generated by the latent model. Image 913 shows the unified segmentation prediction from a unimodal prediction model based on the predictions shown in image array 912. In FIG. 9C, image 921 shows an original unsegmented image while image array 922 includes 25 images illustrating a set of 25 hypotheses or samples generated by the latent model. Image 923 shows the unified segmentation prediction from a unimodal prediction model based on the predictions shown in image array 922.

The present examples illustrate one of the disadvantages of a single prediction model as compared to the latent distribution model of the present disclosure. It can be seen in FIG. 9A, for example, that there is some uncertainty regarding the number of items picked by the robotic arm. Some of the 25 hypotheses predict two items while others predict a single item. The unimodal prediction predicts only a single item. However, the distribution of hypotheses suggests that it is more likely that two items have been picked by the robotic arm because a majority of the hypotheses predict that there are two items. The unimodal hypothesis predicts that there is only one item and has no means for determining that it is wrong or finding an associated confidence with its prediction. In other words, the examples of FIGS. 9A-9C illustrates the risk that a unimodal prediction model can be "confidently wrong."

The processes described herein may be implemented in several different variations of media including software, hardware, firmware, and variations or combinations thereof. For example, methods of uncertainty modeling and segmentation described herein may be implemented in software, while a computing vision system or robotic picking device may be implemented entirely in hardware or a combination. Similarly, embodiments of the technology may be implemented with a trained neural net entirely in software on an external computing system or may be implemented as a combination of the two across one or more devices. The computer vision systems and uncertainty modeling herein may be implemented on various types of components including entirely software-based implementations, entirely hardware-based aspects, such as trained computer vision systems, or variations and combinations thereof.

Figure 10:
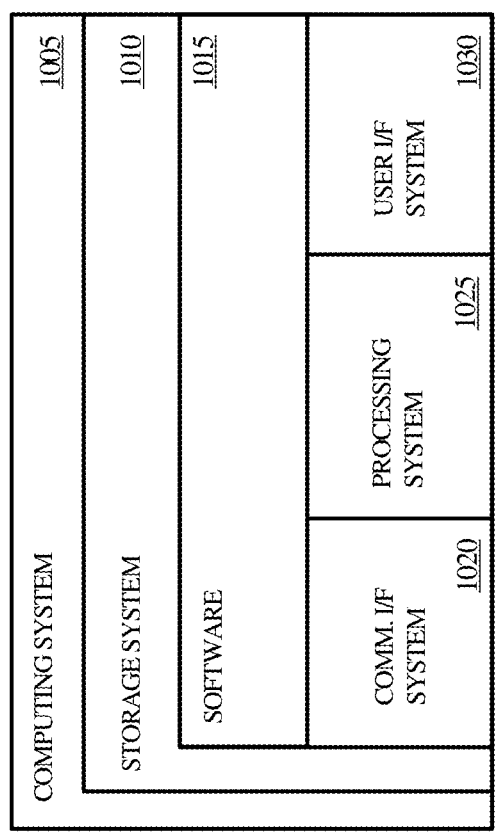
FIG. 10 is an example of a computing system in which some embodiments of the present technology may be utilized.

FIG. 10 illustrates computing system 1005 that is representative of any system or collection of systems in which the various processes, programs, services, and scenarios disclosed herein may be implemented. Examples of computing system 1005 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 1005 may be implemented as a single apparatus, system, or device or may be implemented in a distributed manner as multiple apparatuses, systems, or devices. Computing system 1005 may include, but is not limited to, storage system 1010, software 1015, communication interface system 1020, processing system 1025, and user interface system 1030. Components of computing system 1005 may be optional or excluded in certain implementations. Processing system 1025 is operatively coupled with storage system 1010, communication interface system 1020, and user interface system 1030, in the present example.

Processing system 1025 loads and executes software 1015 from storage system 1010. Software 1015 includes and implements various uncertainty modeling processes described herein, which is representative of the methods discussed with respect to the preceding Figures. When executed by processing system 1025, software 1015 directs processing system 1025 to operate for purposes of uncertainty modeling as described herein for at least the various processes, operational scenarios, and sequences discussed in the foregoing implementations. Computing system 1005 may optionally include additional devices, features, or functionality not discussed for purposes of brevity.

Referring still to FIG. 10, processing system 1025 may comprise a micro-processor and other circuitry that retrieves and executes software 1015 from storage system 1010. Processing system 1025 may be implemented within a single processing device but may also be distributed across multiple processing devices or sub-systems that cooperate in executing program instructions. Examples of processing system 1025 include general purpose central processing units, graphical processing units, application specific processors, and logic devices, as well as any other type of processing device, combinations, or variations thereof.

Storage system 1010 may comprise any computer readable storage media readable by processing system 1025 and capable of storing software 1015. Storage system 1010 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1010 may also include computer readable communication media over which at least some of software 1015 may be communicated internally or externally. Storage system 1010 may be implemented as a single storage device but may also be implemented across multiple storage devices or sub-systems co-located or distributed relative to each other. Storage system 1010 may comprise additional elements, such as a controller, capable of communicating with processing system 1025 or possibly other systems.

Software 1015 may be implemented in program instructions and among other functions may, when executed by processing system 1025, direct processing system 1025 to operate as described with respect to the various operational scenarios, sequences, and processes illustrated herein. For example, software 1015 may include program instructions for implementing uncertainty modeling processes, computer vision processes, neural networks, decision making processes, segmentation processes, or any other reasoning or operational processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 1015 may include additional processes, programs, or components, such as operating system software, modeling. robotic control software, computer vision software, virtualization software, or other application software. Software 1015 may also comprise firmware or some other form of machine-readable processing instructions executable by processing system 1025.

In general, software 1015 may, when loaded into processing system 1025 and executed, transform a suitable apparatus, system, or device (of which computing system 1005 is representative) overall from a general-purpose computing system into a special-purpose computing system customized for one or more of the various operations or processes described herein. Indeed, encoding software 1015 on storage system 1010 may transform the physical structure of storage system 1010. The specific transformation of the physical structure may depend on various factors in different implementations of this description. Examples of such factors may include, but are not limited to, the technology used to implement the storage media of storage system 1010 and whether the computer-storage media are characterized as primary or secondary storage, as well as other factors.

For example, if the computer readable storage media are implemented as semiconductor-based memory, software 1015 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1020 may include communication connections and devices that allow for communication with other computing systems (not shown) over communication networks or connections (not shown). Examples of connections and devices that together allow for inter-system communication may include network interface cards, antennas, power amplifiers, radio-frequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1005 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit." "module," or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise." "comprising," and the like are to be construed in an inclusive sense, as opposed to an exclusive or exhaustive sense; that is to say, in the sense of "including, but not limited to." As used herein, the terms "connected." "coupled," or any variant thereof means any connection or coupling, either direct or indirect, between two or more elements; the coupling or connection between the elements can be physical, logical, or a combination thereof. Additionally, the words "herein." "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A method of operating an image segmentation system, the method comprising:
    collecting at least one image of a scene, wherein the scene comprises a plurality of distinct objects;
    providing the at least one image of the scene as input to a machine learning model trained to generate segmentation predictions;
    receiving an output from the machine learning model comprising a plurality of segmentation predictions for the scene, wherein each segmentation prediction of the plurality of segmentation predictions includes one or more boundaries each representing a boundary predicted to correspond to a single object, and wherein at least one of the plurality of segmentation predictions includes a plurality of boundaries each predicted to correspond to a different object of the plurality of distinct objects;
    determining an uncertainty associated with one or more dimensions of an object associated with each boundary predicted, wherein determining the uncertainty associated with the one or more dimensions is based on agreement between the plurality of segmentation predictions;
    identifying a threshold level of uncertainty associated with the predicted boundaries at which a robotic device may attempt to pick up the objects corresponding to the predicted boundaries; and
    outputting a final segmentation prediction comprising at least one identified boundary, wherein the at least one identified boundary is chosen based on the determined uncertainty of the predicted boundaries not exceeding the threshold level of uncertainty.

2. The method of claim 1, wherein the one or more dimensions comprise sizes of at least a portion of the object corresponding to each boundary predicted.

3. The method of claim 1, wherein the machine learning model uses a random input to generate the plurality of segmentation predictions.

4. The method of claim 1, wherein the image segmentation system comprises:
    a computer-imaging system comprising one or more cameras; and
    the robotic device comprising at least one picking element.

5. The method of claim 4, further comprising, based on the final segmentation prediction, directing the robotic device to attempt to pick up an object of the plurality of distinct objects using the at least one picking element.

6. The method of claim 5, further comprising, determining that the robotic device successfully picked up the object using the picking element.

7. A system comprising:
    one or more computer-readable storage media;
    a processing system operatively coupled to the one or more computer-readable storage media; and
    program instructions, stored on the one or more computer-readable storage media, wherein the program instructions, when read and executed by the processing system, direct the processing system to:
    collect at least one image of a scene, wherein the scene comprises a plurality of distinct objects;
    provide the at least one image of the scene as input to a machine learning model trained to generate segmentation predictions;
    receive an output from the machine learning model comprising a plurality of segmentation predictions for the scene, wherein each segmentation prediction of the plurality of segmentation predictions includes one or more boundaries each representing a boundary predicted to correspond to a single object, and wherein at least one of the plurality of segmentation predictions includes a plurality of boundaries each predicted to correspond to a different object of the plurality of distinct objects;
    determine an uncertainty associated with one or more dimensions of an object associated with each boundary predicted, wherein uncertainty is based on agreement between the plurality of segmentation predictions;
    identify a threshold level of uncertainty associated with the predicted boundaries at which a robotic device may attempt to pick up the objects corresponding to the predicted boundaries; and
    output a final segmentation prediction comprising at least one identified boundary, wherein the at least one identified boundary is chosen based on the determined uncertainty of the predicted boundaries not exceeding the threshold level of uncertainty.

8. The system of claim 7, wherein the one or more dimensions comprise sizes of at least a portion of the object corresponding to each boundary predicted.

9. The system of claim 7, wherein the machine learning model uses a random input to generate the plurality of segmentation predictions.

10. The system of claim 7, further comprising:
    a computer-imaging system comprising one or more cameras; and
    the robotic device comprising at least one picking element.

11. The system of claim 10, wherein the program instructions, when read and executed by the processing system, further direct the processing system to, based on the final segmentation prediction, direct the robotic device to attempt to pick up an object of the plurality of distinct objects using the at least one picking element.

12. The system of claim 11, wherein the program instructions, when read and executed by the processing system, further direct the processing system to determine that the robotic device successfully picked up the object using the at least one picking element.

13. One or more non-transitory computer-readable storage media having program instructions stored thereon to generate segmentation predictions, wherein the program instructions, when read and executed by a processing system, direct the processing system to at least:
  collect at least one image of a scene, wherein the scene comprises a plurality of distinct objects;
  provide the at least one image of the scene as input to a machine learning model trained to generate segmentation predictions;
  receive an output from the machine learning model comprising a plurality of segmentation predictions for the scene, wherein each segmentation prediction of the plurality of segmentation predictions includes one or more boundaries each representing a boundary predicted to correspond to a single object, and wherein at least one of the plurality of segmentation predictions includes a plurality of boundaries each predicted to correspond to a different object of the plurality of distinct objects;
  determine an uncertainty associated with one or more dimensions of an object associated with each boundary predicted, wherein the uncertainty is based on agreement between the plurality of segmentation predictions;
  identify a threshold level of uncertainty associated with the predicted boundaries at which a robotic device may attempt to pick up the objects corresponding to the predicted boundaries; and
  output a final segmentation prediction comprising at least one identified boundary, wherein the at least one identified boundary is chosen based on the determined uncertainty of the predicted boundaries not exceeding the threshold level of uncertainty.

14. The one or more non-transitory computer-readable storage media of claim 13, wherein the one or more dimensions comprise sizes of at least a portion of the object corresponding to each boundary predicted.

15. The one or more non-transitory computer-readable storage media of claim 13, wherein the machine learning model uses a random input to generate the plurality of segmentation predictions.

16. The one or more non-transitory computer-readable storage media of claim 13, wherein the program instructions, when read and executed by the processing system, further direct the processing system to, based on the final segmentation prediction, direct a robotic device to attempt to pick up an object of the plurality of distinct objects using at least one picking element of the robotic device.

17. The one or more non-transitory computer-readable storage media of claim 16, wherein the program instructions, when read and executed by the processing system, further direct the processing system to determine that the robotic device successfully picked up the object using the at least one picking element.

* * * * *